(12) United States Patent
Hua

(10) Patent No.: US 11,663,742 B1
(45) Date of Patent: May 30, 2023

(54) AGENT AND EVENT VERIFICATION

(71) Applicant: Amazon Technologies, Inc., Seattle, WA (US)

(72) Inventor: Gang Hua, Sammamish, WA (US)

(73) Assignee: Amazon Technologies, Inc., Seattle, WA (US)

(*) Notice: Subject to any disclaimer, the term of this patent is extended or adjusted under 35 U.S.C. 154(b) by 227 days.

(21) Appl. No.: 17/146,230

(22) Filed: Jan. 11, 2021

Related U.S. Application Data

(63) Continuation of application No. 14/747,846, filed on Jun. 23, 2015, now Pat. No. 10,891,736.

(51) Int. Cl.
| | |
|---|---|
| *G06T 7/00* | (2017.01) |
| *G06V 40/20* | (2022.01) |
| *G06T 7/292* | (2017.01) |
| *G06T 7/246* | (2017.01) |
| *G06T 7/33* | (2017.01) |
| *G06T 7/73* | (2017.01) |

(52) U.S. Cl.
CPC ............... *G06T 7/97* (2017.01); *G06T 7/251* (2017.01); *G06T 7/292* (2017.01); *G06T 7/33* (2017.01); *G06T 7/73* (2017.01); *G06V 40/20* (2022.01); *G06T 2207/10004* (2013.01); *G06T 2207/10016* (2013.01); *G06T 2207/30108* (2013.01); *G06T 2207/30196* (2013.01); *G06T 2207/30204* (2013.01); *G06T 2207/30232* (2013.01)

(58) Field of Classification Search
CPC ........... G06T 7/97; G06T 7/251; G06T 7/292; G06T 7/33; G06T 7/73; G06T 2207/10004; G06T 2207/10016; G06T 2207/30108; G06T 2207/30196; G06T 2207/30204; G06T 2207/30232; G06V 40/20
See application file for complete search history.

(56) References Cited

U.S. PATENT DOCUMENTS

| | | | |
|---|---|---|---|
| 7,225,980 B2 | 6/2007 | Ku et al. | |
| 7,504,949 B1 * | 3/2009 | Rouaix | G06Q 10/06 340/572.1 |
| 7,949,568 B2 | 5/2011 | Fano et al. | |
| 8,009,863 B1 | 8/2011 | Sharma et al. | |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Amara Abdi
(74) *Attorney, Agent, or Firm* — Athorus, PLLC

(57) ABSTRACT

Described are systems and methods for determining an agent that performed an event within a materials handling facility. A series of overhead images that include representations of the event location and one or more agents are processed to determine a motion or movement of the agent over a period of time. For example, a motion model representative of a motion of the agent over a period of time is generated from the images. A distance between the motion model and the event location is also determined. An association between the agent and the event may be determined based on the motion model and the distance between the motion model and the event location.

22 Claims, 19 Drawing Sheets

(56) References Cited

U.S. PATENT DOCUMENTS

| | | |
|---|---|---|
| 8,009,864 B2 | 8/2011 | Linaker et al. |
| 8,175,925 B1 | 5/2012 | Rouaix |
| 8,189,855 B2 | 5/2012 | Opalach et al. |
| 8,423,431 B1 | 4/2013 | Rouaix et al. |
| 8,630,924 B2 | 1/2014 | Groenevelt et al. |
| 8,688,598 B1 * | 4/2014 | Shakes ............. G06Q 10/06395 |
| | | 705/332 |
| 9,473,747 B2 | 10/2016 | Kobres et al. |
| 9,833,197 B1 * | 12/2017 | Elhawary ............ A61B 5/0022 |
| 2003/0002712 A1 | 1/2003 | Steenburgh et al. |
| 2004/0181467 A1 | 9/2004 | Raiyani et al. |
| 2008/0055087 A1 | 3/2008 | Horii et al. |
| 2008/0077511 A1 | 3/2008 | Zimmerman |
| 2008/0109114 A1 | 5/2008 | Orita et al. |
| 2009/0121017 A1 | 5/2009 | Cato et al. |
| 2009/0129630 A1 | 5/2009 | Gloudemans et al. |
| 2009/0213240 A1 | 8/2009 | Sim et al. |
| 2009/0245573 A1 | 10/2009 | Saptharishi et al. |
| 2011/0011936 A1 | 1/2011 | Morandi et al. |
| 2011/0211754 A1 | 9/2011 | Litvak et al. |
| 2012/0284132 A1 | 11/2012 | Kim et al. |
| 2013/0076898 A1 | 3/2013 | Philippe et al. |
| 2013/0184592 A1 | 7/2013 | Venetianer et al. |
| 2013/0253700 A1 | 9/2013 | Carson et al. |
| 2014/0279294 A1 * | 9/2014 | Field-Darragh ... G06Q 30/0282 |
| | | 705/28 |
| 2014/0362223 A1 * | 12/2014 | LaCroix ................ H04N 7/183 |
| | | 348/150 |
| 2015/0012396 A1 * | 1/2015 | Puerini ................. G06V 20/52 |
| | | 705/28 |
| 2015/0019391 A1 | 1/2015 | Kumar et al. |
| 2015/0023563 A1 | 1/2015 | Koppal |
| 2015/0029339 A1 * | 1/2015 | Kobres ................. H04N 7/181 |
| | | 348/150 |
| 2015/0073907 A1 | 3/2015 | Purves et al. |
| 2015/0302310 A1 * | 10/2015 | Wernevi ................ G16H 50/20 |
| | | 706/12 |
| 2016/0217625 A1 * | 7/2016 | Oba ........................ G06T 19/20 |
| 2019/0220954 A1 | 7/2019 | Harviainen et al. |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner

AGENT AND EVENT VERIFICATION

PRIORITY CLAIM

This application is a Continuation of U.S. patent application Ser. No. 14/747,846, filed Jun. 23, 2015, and titled "Associating An Agent With An Event Using Motion Analysis," the contents of which are herein incorporated by reference in their entirety.

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
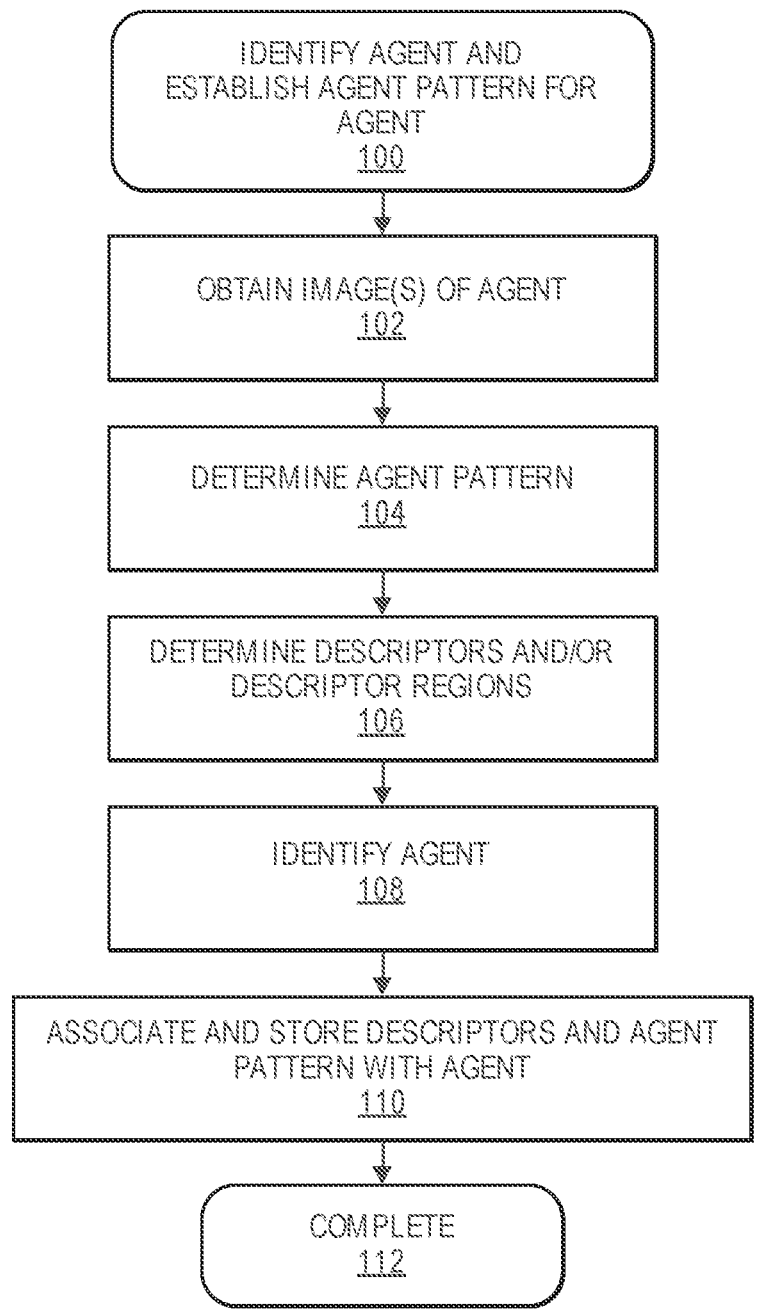
FIG. 1 is a flow diagram of an example process for identifying an agent and establishing an agent pattern, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes a multiple-camera system and process for identifying an agent that performed an event and associating that agent with the event. In some implementations, a materials handling facility may include multiple overhead cameras that are fixed above a surface of the materials handling facility and oriented toward the surface. The cameras obtain images that include color values and/or depth values for each pixel of the image. The color values and depth values may then be used to determine an agent pattern representative of an agent that is positioned within a field of view of one or more of the cameras.

When an event (e.g., item pick from an inventory location, item place into an inventory location) is detected within the materials handling facility, agent patterns near the location of the event are determined, along with touch points near the location of the event. Static images of the agent pattern and/or the event are processed in an effort to link an agent pattern to the event and thereby determine an agent that was involved in the event. Processing of static agent pattern images and/or the event is a quick and efficient mechanism to link events with agent patterns. However, in some instances, additional processing is needed to confirm and/or determine an association between an agent pattern and an event.

If an event cannot be associated with an agent pattern based on static image processing, a series of images of the agent pattern may be considered to determine a motion or movement of the agent over a period of time. For example, a motion model representative of a motion of the agent over a period of time is generated from the images. The motion model and the event location may be used to associate an event with an agent. While more time consuming and computationally intensive than static image processing, motion model processing may be used to increase a confidence that an event can be associated with a particular agent.

If motion processing cannot be used to determine an association between an event and an agent, or as an alternative to motion processing, in some implementations, images from side-view cameras that include representations of the event location and the agent(s) near the event location may be used in an effort to associate the event with an agent. For example, depth information included in the agent pattern may be combined side-view images of the event location and the side-view images may be segmented to distinguish different agents represented in the image. Upon segmentation, a distance between the representation of each agent and the event location is determined to establish an association between the event and one of the agents represented in the side-view image.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. An event time and an event location may be determined from any one or more outputs within the materials handling facility. For example, if an agent picks an item from an inventory location or places an item at an inventory location, one or more sensors (e.g., load cells, radio frequency identification (RFID) readers, scanners, visual identification readers) may provide an indication of a detected change representative of the event, a time, and a location. An agent, as used herein, includes any human or robotic device that may be involved in an event (e.g., item pick from an inventory location, item place at an inventory location) within a materials handling facility.

FIG. 1 is a flow diagram of an example process 100 for identifying an agent and establishing an agent pattern, according to an implementation. The example process of FIG. 1, and each of the other processes and sub-processes discussed herein, may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the routine. Likewise, one or more of the operations may be considered optional.

Figure 18:
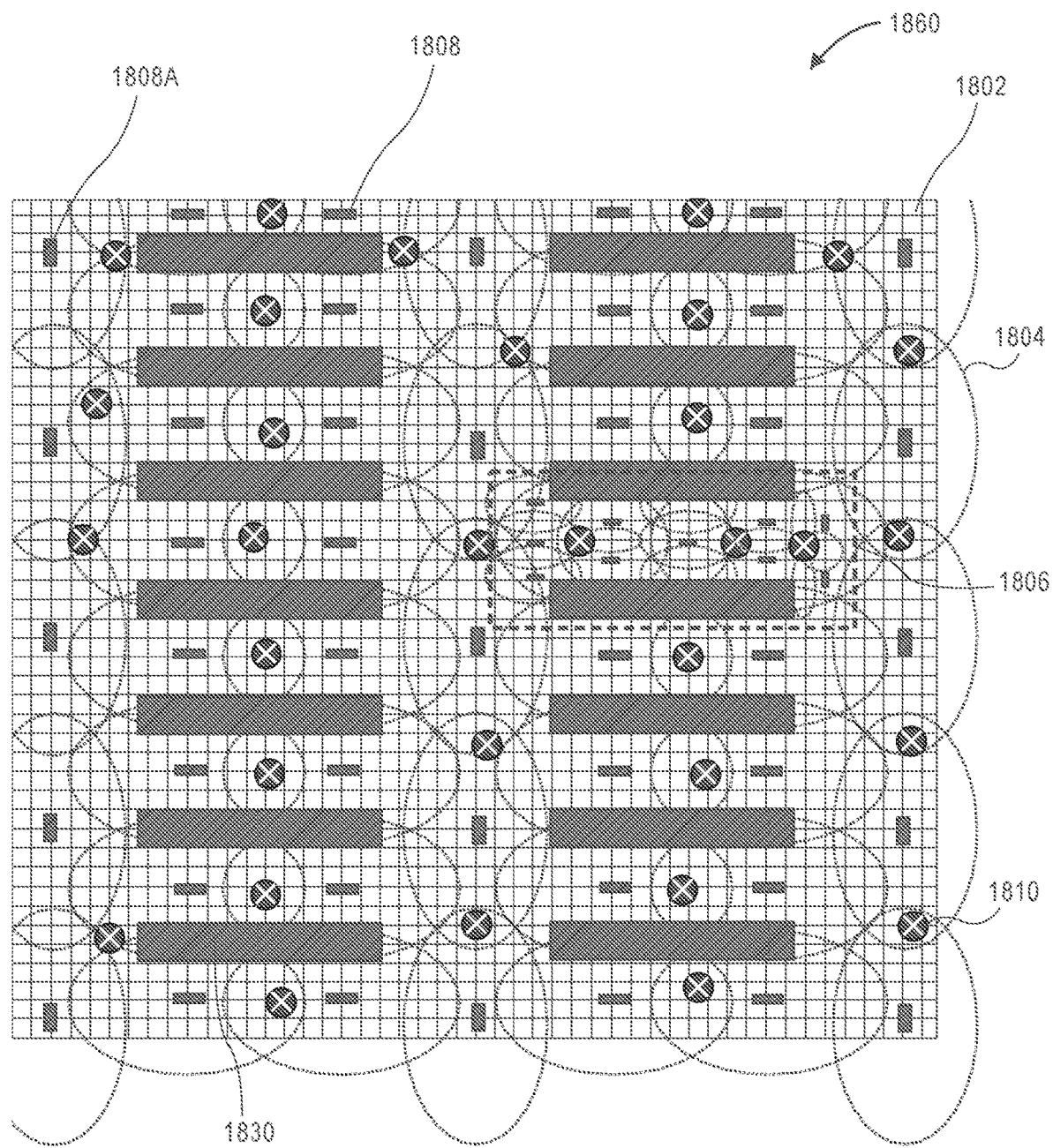
FIG. 18 is a block diagram of an overhead view of a cluster, according to an implementation.

The example process 100 begins by obtaining an image of an agent as they arrive or enter the materials handling facility, as in 102. For example, in some implementations, there may be one or more dedicated check-in or entry locations. As the agent arrives at the check-in location or passes through the entry location, one or more images of the agent may be obtained. In some implementations, images of the agent may be obtained from overhead with an overhead camera positioned above the agent and oriented straight down, similar to the positioning discussed below for cameras of a cluster (FIG. 18).

For example, a camera may be positioned at a defined location within the materials handling facility at a known distance above the surface of the materials handling facility. When the agent is located in the field of view of the camera, one or more images of the agent may be obtained. The corresponding image data may include RGB color information for each pixel, coordinate information (e.g., horizontal coordinates and depth information), temperature information, etc.

Utilizing the obtained image, an agent pattern representative of the agent is determined, as in 104. For example, the image data may be processed to determine an approximate height, an approximate size, and/or an approximate shape of the agent. In some implementations, a maximum or peak height of the agent may be determined along with a size, orientation, and/or shape of the agent's head and/or shoulders. The agent pattern may be determined from the one or more images or may be established over a period of time. For example, while the agent is being authenticated or identified, a series of images or video may be obtained and those images may be processed to determine the agent pattern, which may include the approximate height, size, shape, color, texture, etc., representative of the agent.

The image data may also be processed to determine descriptors that may be utilized to aid in a tracking or re-identification of the agent, as in 106. For example, if the agent is wearing a bright colored shirt (e.g., yellow shirt), the color of the shirt may be a descriptor that may be used to aid in tracking the position of the agent within the materials handling facility. In some implementations, the agent pattern may be segmented into one or more descriptor regions. For example, anthropometry percentages may be utilized to segment the agent pattern into descriptor regions based on percentages of the peak height determined for the agent pattern. For example, as discussed, image data of the agent pattern may be segmented into a torso region, a head region, etc. A descriptor may be determined for each descriptor region.

A descriptor may be any feature of the agent, the agent pattern, or the descriptor region. For example, an HSV color histogram, which represents a distribution of colors, may be determined for each descriptor region based on the color values of the pixels located in that descriptor region. As another example, the descriptor may be a size, shape, volume, color pattern, texture, facial feature, etc., of the agent, or a portion of the agent represented by the agent pattern.

In addition to generating an agent pattern and determining one or more descriptors, the agent is also identified, as in 108. Agent identification may be accomplished using a variety of techniques. For example, images of the agent may be obtained and processed using object recognition algorithms, pattern matching algorithms, or the like, to identify the agent. Alternatively, or in addition thereto, the agent may provide an identification (e.g., agent name, password), the agent may present an identifier (e.g., identification badge, card), a RFID tag in the possession of the agent may be detected, a visual tag (e.g., barcode, bokode, watermark) in the possession of the agent may be detected, biometrics may be utilized to identify the agent, etc.

Upon agent identification, the agent pattern and any descriptors are associated with an agent profile and corresponding agent identifier for the agent, as in 110. The agent pattern may be stored in the agent pattern data store and the descriptors may be stored in the descriptors data store. Likewise, a session identifier may be generated and associated with the agent profile, the agent pattern and/or the descriptors. In some implementations, the session identifier may be utilized to identify the agent profile and the agent identifier may be provided by the cluster aggregation system to other systems. In some implementations, the actual identity of the agent may not be discernible from the session identifier and/or the agent identifier. In such an implementation, only systems that need access to the actual agent information may be able to use the session identifier and/or agent identifier to obtain access to agent information.

Upon agent identification and association with an agent profile, the example process 100 completes, as in 112.

Figure 2:
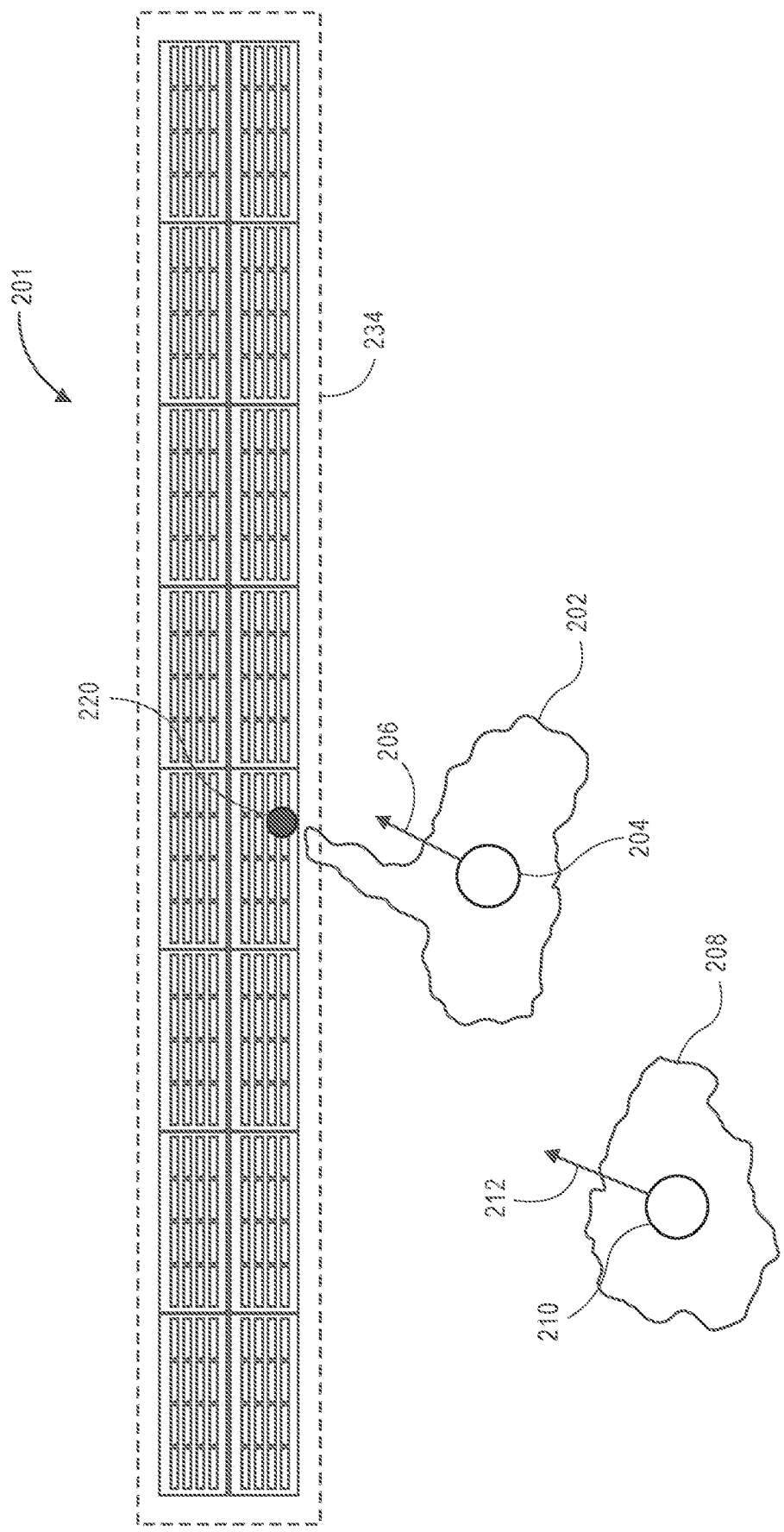
FIG. 2 is a block diagram of an inventory area and multiple agent patterns, according to an implementation.

FIG. 2 is a block diagram of an inventory area 201 and multiple agent patterns 202, 208, according to an implementation. As discussed above, the agent patterns 202, 208 are determined by processing image information obtained from overhead cameras located above the inventory area 201. In one implementation, the agent pattern is determined based on depth information obtained by the overhead cameras. As agents move throughout the materials handling facility, they may interact with items, pick items from inventory locations, place items at inventory locations, move items, and/or perform other events.

Each time an event is detected, an event time and an event location 220 are generated. Event time and event location 220 are representative of the location of where the event was detected and a time, or time duration, during which the event was detected. The event location 220 may be a specific location identified by three coordinates of a coordinate space or an area in which the event occurred. For example, the event location may include a first location at which the event initiated (e.g., when the agent reaches their hand into an inventory location) and a second location at which the event ended (e.g., when the agent removes their hand from the inventory location) and an area between the first location and the second location may be included as the event location. In another example, the event location may include an identification of an inventory location at which an event was detected.

Any number of the input components, such as those discussed below with respect to FIGS. 16-17 may detect and report an occurrence of an event. For example, a pressure sensor may detect an event when an item is picked from an inventory location, placed at an inventory location, and/or moved at an inventory location. An event may be detected based on a processing of images obtained from a camera, such as a camera located above the inventory area, a camera located on an inventory shelf, etc.

When an event is detected, the time of the event, the item involved in the event, and the agent involved in the event are determined. For example, if the event is an item pick from an inventory location, the time of the event or the event time duration may be the time during which it was determined that the item was picked from the inventory location. The time window of an event may include the determined event time or time duration and also may include a defined period of time before and/or after the determined event time or event time duration. For example, the event time window may include one second before and one second after a determined event time or event time duration. The time window can be expressed in a number of ways, including, for example, a start time (used in conjunction with an implicit/default duration or length), a start time and an explicit duration or length, a start time and an end time, offset information for use relative to an event time (e.g., event time+/−some amount of time), and the like.

The item may be identified based on a known list of items at the inventory location where the event occurred, a change in a weight at the inventory location, a RFID reader detecting a movement, removal, or addition of an RFID tag, a visual identifier, such as a bar code scanner, detecting a visual tag (e.g., barcode) as an item is picked or placed, etc.

To identify the agent involved in the event, the agent patterns 202, 208 near the event location 220 during a time window of the event are determined. In some implementations, the agent and/or agent patterns may be determined without information as to the item involved in the event. For example, as discussed below, the agent patterns may be determined based on the determined event time or the event time duration along with the event location 220.

An agent pattern may be considered a candidate agent pattern if it is located within a defined distance of an event location 220 during the event time window. The defined distance may be any defined value and may vary for different agents, different items, different inventory locations, etc. For example, the defined distance may be five feet from the event location. In some implementations, the defined distance may only include distances in which agent interaction with the item is possible. For example, a defined distance may only consider an agent pattern located in the same aisle as the event location.

In some implementations, if there is only a single agent pattern detected within the defined distance during the event time window, the agent associated with the agent pattern may be determined to be involved in the event. However, in other implementations, the agent pattern and/or images relating to the event may be processed to confirm that the agent corresponding to the agent pattern was involved in the event. Processing an agent pattern to confirm an association with the event is discussed in further detail below. If there are multiple candidate agent patterns for an event, the implementations described herein may disambiguate between candidate agent patterns and determine which agent pattern is to be associated with the event.

Returning to FIG. 2, by processing images from the overhead cameras that include the event location 220 in the field of view of the overhead cameras, two agent patterns 202, 208 are determined. As illustrated, for each agent pattern, a center point 204, 210 and/or an orientation 206, 212 of the agent may be determined. For example, the center point 204, 210 of the agent pattern may be determined based on the depth information for pixels that represent the agent pattern (e.g., pixels with greatest height above surface), by selecting a group of pixels at or near a center of the agent pattern, etc. Orientation 206, 212, which is represented graphically as a vector in FIG. 2, may be determined based on a movement of the agent over a period of time, based on image processing, etc. As discussed further below, the agent pattern and the event location may be utilized to determine a likelihood that an agent was involved in the detected event.

Figure 3:
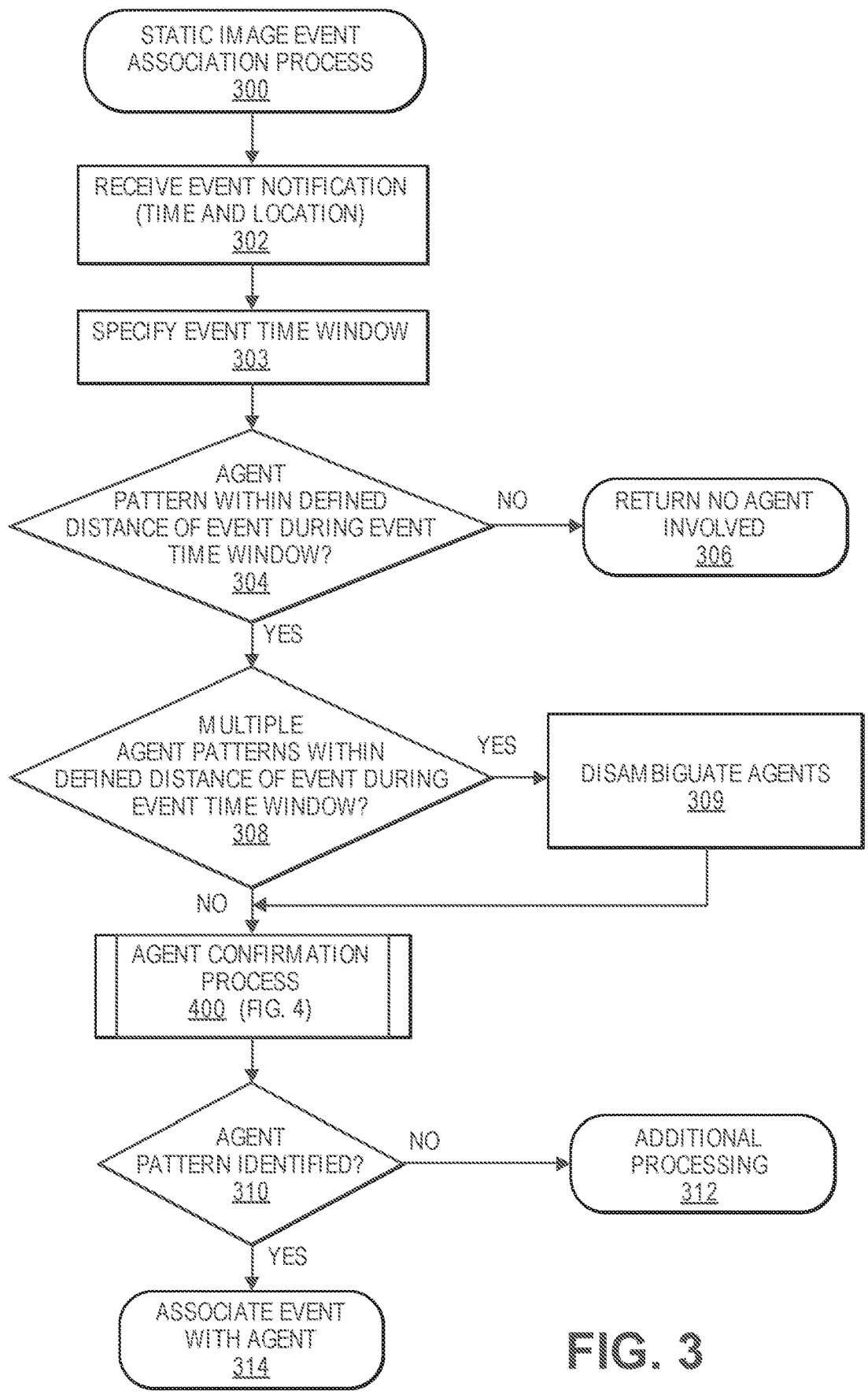
FIG. 3 is a flow diagram of an example static image event association process, according to an implementation.

FIG. 3 is a flow diagram of an example static image event association process 300, according to an implementation. The example process 300 starts upon receipt of an event notification, as in 302. An event notification or event information indicates at least an event location and an event time or event time duration. An event notification or event information may be generated when an event is detected by one or more input components within the materials handling facility. For example, an event notification or event information may be generated when a change in a weight at an inventory location occurs, representative of an item pick (decrease in weight) or an item place (increase in weight).

Upon receiving an event notification or event information, an event time window is specified, as in 303. An event time window may be any period of time that includes the event time or event time duration. For example, the event time window may include the event time or event time duration, the thirty seconds preceding the event time or the event time duration and thirty seconds following the event time or the event time duration. In other implementations, the event time window may be a longer period of time (e.g., one minute before the event time and one minute after the event time) or a shorter period of time (e.g., one second before the event time and one second after the event time).

Based on the event location and the event time window, a determination is made as to whether an agent pattern is within a defined distance of the event location during the event time window, as in 304. As discussed above with respect to FIG. 2, a defined distance may be any distance from an event location. The defined distance may be the same or different for different events, different locations, different agents, etc. Likewise, while the examples discussed herein describe determining if an agent pattern is within a defined distance of an event location, the implementations are equally applicable to determining if an event location is within a defined distance of an agent pattern.

It may be determined if an agent pattern is within the defined distance of the event location during the event time window by considering the location of agent patterns during the event time window. If it is determined that there is no agent pattern within a defined distance of the event location during the event time window, it is determined that no agent is involved in the event, as in 306. For example, an item may fall off a shelf due to vibrations in the store without involvement of an agent. If it is determined that no agent is involved in the event, the example process 300 may complete. Alternatively, the example process 300 may provide information (e.g., images, item information, event type, event location, event time or event time duration) for manual review. During manual review, an agent who may be local or remote from the materials handling facility may review the information relating to the event to confirm the event information; in this instance, to confirm that no agent was involved in the event, and/or to provide other information.

If it is determined that an agent pattern is located within a defined distance of the event location during an event time window, a determination is made as to whether multiple agent patterns are within the defined distance of the event location during the event time window, as in 308. Each additional agent pattern may be determined to be within the defined distance of the event location during the event time window in a manner similar to that discussed above with respect to block 304.

If it is determined that there are multiple agent patterns within the defined distance of the event location during the event time window, the agent patterns are disambiguated, as in 309. For example, the image may be further processed using one or more image processing algorithms to segment the image such that each agent pattern is discernible. Alternatively, or in addition thereto, the depth information may be further processed to identify changes in depth and/or shape represented by the depth information that identify a difference or separation between the multiple agent patterns.

If it is determined that only one agent pattern is within the defined distance of the event location during the event time window, or after disambiguating multiple agent patterns, the agent confirmation process 400 is performed to confirm which agent pattern should be associated with the event. The event confirmation process 400 is discussed further below with respect to FIG. 4.

Based on the results from the agent confirmation process 400 (FIG. 4), a determination is made as to whether an agent pattern has been identified, as in 310. If it is determined that an agent pattern has not been identified and/or if an additional processing needed notification was returned from the example process 400, the event notification and corresponding information is sent for additional processing, as in 312. The corresponding information may include images of the event location during the event time window, an identification of the agent pattern(s) determined to be within the defined distance of the event location during the event time window, overhead images of the agent patterns during the event time window, etc.

If it is determined that the agent pattern has been identified, the event is associated with the agent associated with the determined agent pattern, as in 314. For example, if the event was an item pick, the action of an item pick may be associated with the agent pattern and/or the agent associated with the agent pattern. Likewise, the item involved in the event may be associated with the agent pattern and/or the agent associated with the agent pattern.

Figure 4:
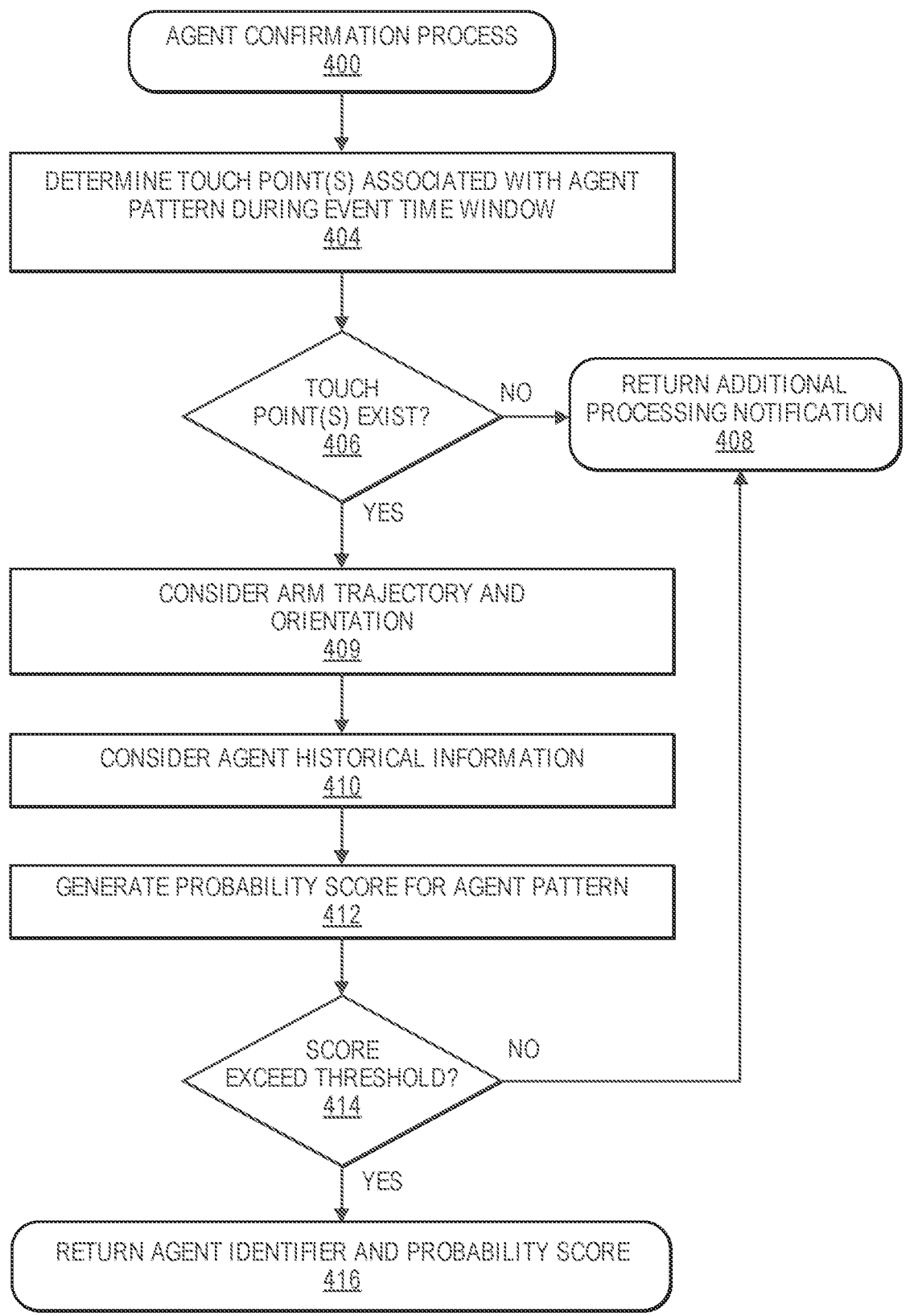
FIG. 4 is a flow diagram of an example agent confirmation process, according to an implementation.

FIG. 4 is a flow diagram of an example agent confirmation process 400, according to an implementation. The agent confirmation process may be performed for a single agent pattern, as discussed above with respect to FIG. 3, and/or for multiple candidate agent patterns.

The example process 400 begins by determining touch points associated with the agent during the event time window and within the defined distance, as in 404. An agent touch point, as used herein, is a detected interaction between an agent and an inventory location. For example, a touch point may include an agent reaching into an inventory location, an agent touching an item at an inventory location, an agent leaning on an inventory location, an agent moving very close to an inventory location, or any other detected interaction between an agent and an inventory location. Agent touch points may be determined based on one or more input devices. For example, referring again to FIG. 2, a perimeter 234 may be defined around each inventory shelf and, if an agent or agent pattern enters the perimeter 234, a touch point may be determined. For example, the agent associated with agent pattern 202 has reached their arm across the perimeter 234 and into the inventory location. The touch point may be defined as the three dimensional location of where the agent reached into the inventory location. For example, overhead cameras, which may obtain both color and depth information, may be utilized to determine when an agent, or a portion thereof, enters a perimeter 234 and the location information corresponding to the image of the agent within the perimeter may be utilized as the location of the touch point.

Returning to FIG. 4, a determination is made as to whether any touch points exist for the agent pattern within the defined distance of the event location during the event time window, as in 406. If it is determined that no touch points exist for the agent pattern, the example process 400 may send an additional processing needed notification, as in 408, identifying that additional processing, such as motion model event association (FIG. 5), multi-view event association (FIGS. 8A-8B), and/or manual review of the event location and/or agent pattern is to performed to determine if the agent was involved in the event. In instances where the example process 400 is processing multiple agent patterns with respect to an event notification, agent patterns with no corresponding touch points may be removed from consideration and the example process 400 may proceed with the other agent patterns determined to be within the defined distance of the event location during the event time window.

If a touch point is determined to exist, an arm trajectory and arm orientation may be determined for the agent to link the agent pattern to the touch point, as in 409. For example, the depth information obtained from the overhead camera may be used to determine an arm trajectory and/or orientation of the agent. In addition to considering the arm trajectory and/or agent orientation of the agent, agent historical information may also be considered to confirm that the agent pattern is to be associated with the event, as in 410. For example, the agent historical information, such as which arm is typically utilized by the agent to pick items, whether the agent has previously picked the item involved in the event, the items picked by the agent during the current session at the materials handling facility, etc., may be considered as a factor in determining the probability that the agent associated with the agent pattern was involved in the event.

Based on the determined touch points, arm trajectory, agent orientation, and/or the agent pattern history, a score representative of the probability that the agent participated in the event is determined, as in 412. For example, a score representative of the likelihood of each factor may be considered and/or combined to generate a probability score. Based on the probability score, a determination is made as to whether the probability score exceeds a probability threshold, as in 414. The probability threshold may be any defined threshold that must be satisfied before an agent pattern is associated with an event. The probability threshold may be different for different agents, different items, different inventory locations, different times of day, different materials handling facilities, etc. If it is determined that the probability score for the agent pattern does not exceed the probability threshold, an additional processing needed notification is returned, as in 408.

If the probability score exceeds the probability threshold, the agent identifier and optionally the probability score is returned, as in 416. In implementations where the agent confirmation process 400 is considering multiple agent patterns for an event, rather than determining if the probability score exceeds a threshold and either returning the probability score and agent pattern or sending for manual review, each agent pattern and probability score, once determined, may be returned.

In some implementations in which there is only one agent pattern within the defined distance of the event location during the event time window, the example process 400 may only consider whether there is a touch point near the event location and if there is an arm link between the event location and the agent pattern. If a touch point and arm link between the agent pattern and the touch point exist, it may be determined that the agent was involved in the event, and the agent identifier may be returned.

While the static image processing provides an efficient and low computation cost technique for associating events with an agent, if the confidence is not high enough that the agent performed the event, additional processing is needed. Rather than defaulting to a manual review for resolution, a motion model analysis and/or multi-view event analysis may be performed to determine an agent that is to be associated with an event. In some implementations, the motion model analysis may be performed if a static image analysis cannot be used to associate an agent with an event and the multi-view event analysis may be performed if the motion model analysis cannot be used to associate the event with an agent.

The motion model supplements the static image analysis by determining motion of the agent during the event time window based on color and/or depth information from the overhead images obtained during the time window.

Figure 5:
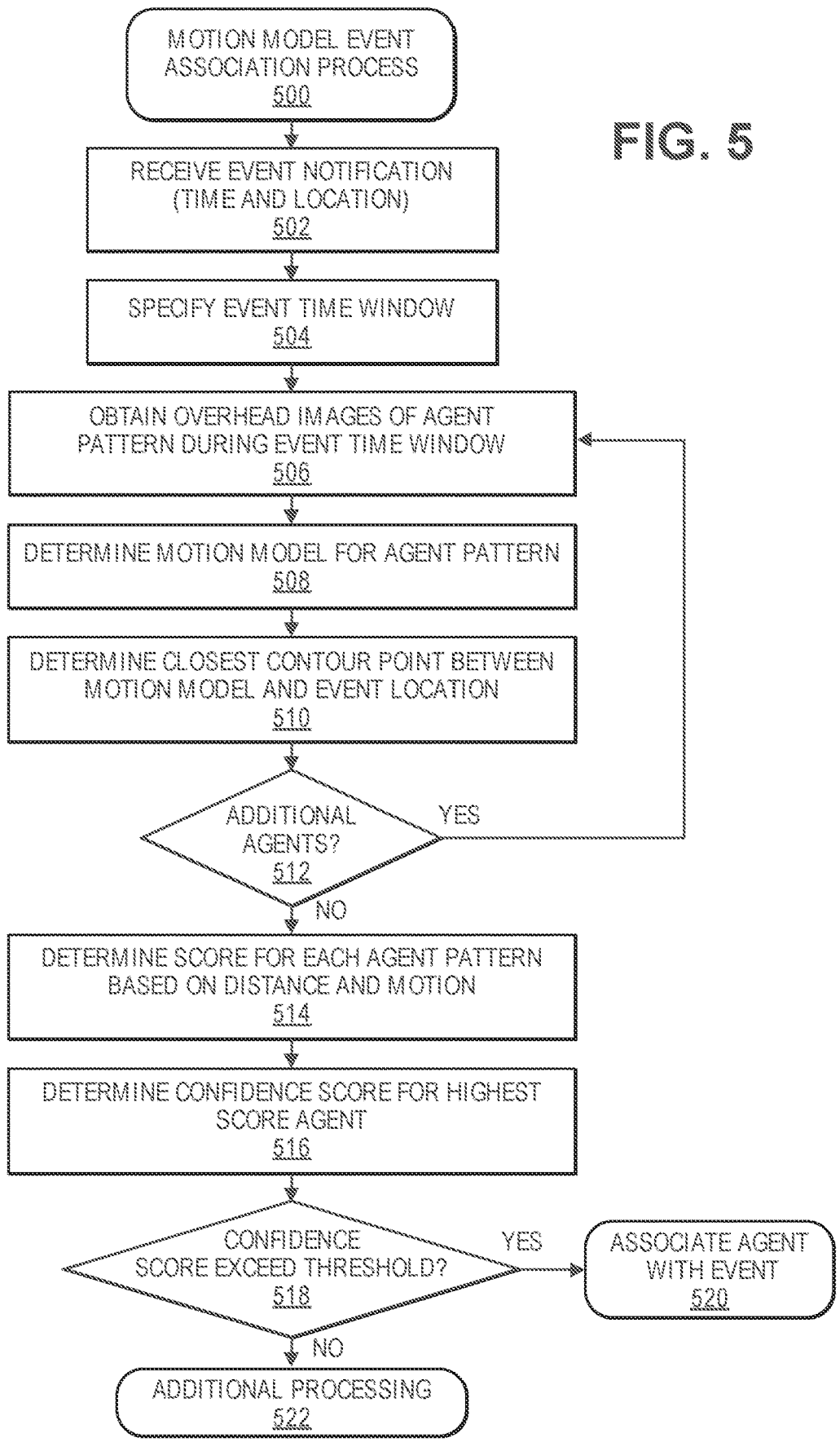
FIG. 5 is a flow diagram of an example motion model event association process, according to an implementation.

For example, referring to FIG. 5, illustrated is an example motion model event association process 500, according to an implementation. The example process 500 starts upon receipt of an event notification or event information, as in 502. As discussed above, an event notification or event information indicates at least an event location and an event time or event time duration.

Upon receiving an event notification or event information, an event time window is specified, as in 504. As discussed above, an event time window may be any period of time that includes the event time or event time duration. For example, the event time window may include the event time or event time duration, and one second before and once second following the event time.

Figure 6:
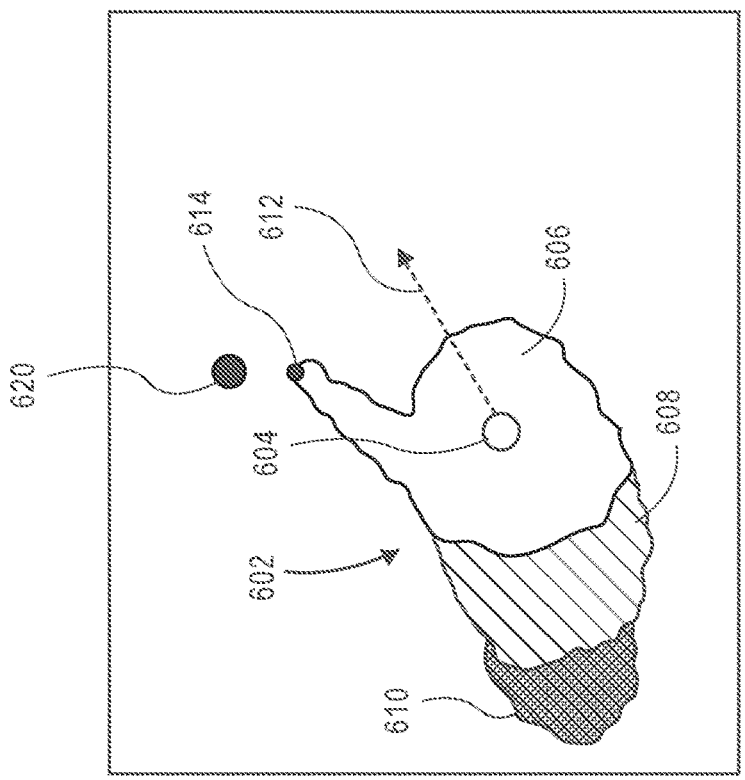
FIG. 6 is a diagram of a motion model, according to an implementation.

Based on the event time window, overhead images that include a representation of the agent pattern(s) within a defined distance of the event location are obtained, as in 506. In one implementation, the overhead cameras may obtain video at six frames per second. In such a configuration, the example process 500 may obtain the six frames preceding the event time and the six frames following the event time. The obtained overhead images are processed to determine a motion model for the agent pattern, as in 508. The motion model includes position information of the agent at different points in time during the event time window. The motion model may be represented graphically. For example, the overhead images may be combined and, based on the time of each image, different pixels representative of the agent pattern may be altered to represent a gradient history illustrating a motion of the agent during the event time window. For example, referring to FIG. 6, illustrated is a motion model 602 of an agent pattern. As illustrated, the motion model is represented based on an intensity of a pixel in the image as a function of the temporal history of motion at that point in the image. In one implementation, for each image, pixels corresponding to a position of the agent in the image are determined and a time at which the image was obtained are associated with those pixels. This is done for each image and the different times associated with the different groups of pixels represent the temporal history of motion. A two-dimensional motion vector 612 may then be estimated by measuring the gradient of the motion model 602. Based on the motion vector, the pixels of the motion model 602 are segmented to illustrate different aspects of the motion model 602 and motion of the agent. For example, pixels 610, 608, 606 are represented with different intensities to illustrate a motion of the agent during the event time window. Likewise, a center point 604 of the agent pattern that is represented by the motion model 602 may also be included in the motion model 602.

Returning to FIG. 5, in addition to determining a motion model, a closest contour point or minimum distance between the motion model and the event location is determined, as in 510. For example, the example process 500 may search pixels along a direction from the center point of the motion model to the event location 620 and determine the closest contour point of the motion model to the event location. For example, referring to FIG. 6, the example process 500 may search pixels along a direction from the center point 604 to the event location 620 and determine the contour point 614 of the motion model 602 that is a minimum distance from the event location 620. In another implementation, the example process 500 may search pixels radially outward from the event location 620 to locate a closest contour point of a motion model that is within a defined distance of the event location. In determining distances between contour points of the motion model and the event location, the real world position of each are considered. For example, the event location corresponds to a first real world position (x, y, z) within the materials handling facility and each pixel of the overhead camera also corresponds to real world positions. The example process 500 may determine a closest contour point by computing a distance between the real world position of each contour point, as represented by the real world position of the corresponding pixel. The closest contour point will be the contour point with the minimum computed distance between the real world position of the contour point and the real world position of the event location.

A determination is then made as to whether there are additional agents within a defined distance of the event location during the event time window, as in 512. For example, the overhead images include multiple agent patterns. If it is determined that there are additional agents within the defined distance of the event location, the example process 500 returns to block 506 and determines a motion model and closest contour point for each agent.

Figure 7:
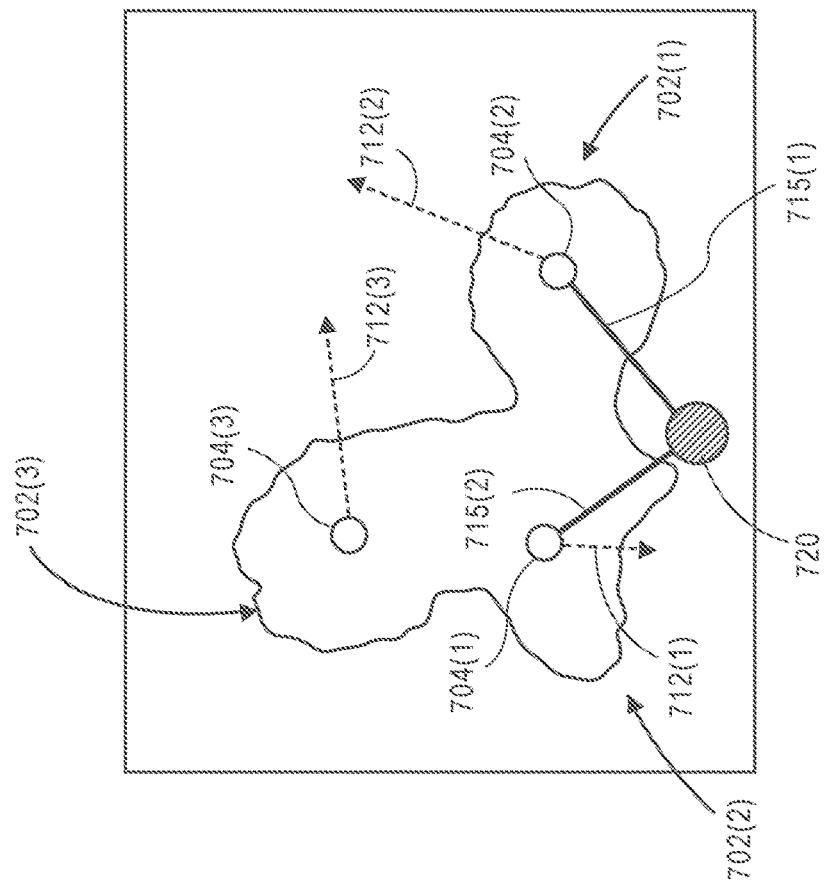
FIG. 7 is a diagram of multiple motion models and events, according to an implementation.

For example, referring briefly to FIG. 7, illustrated are three motion models 702(1), 702(2), 702(3) and an event location 720. For each motion model 702, a motion vector 712(1), 712(2), 712(3) is determined and a closest contour point from a center point 704(1), 704(2), 704(3) of the motion model to the event location is determined. For example, a direct line 715(1), 715(2) or region between a center point 704 of each motion model 702 and the event location 720 may be determined and the process may move outward from the center point 704 until a contour point of the motion model that is closest to the event location 720 is determined.

If it is determined that there are no additional agent patterns within the defined distance of the event location during the event time window, a score for each agent pattern is determined, as in 514. The score A(i) for each agent may be computed as:

$$A(i) = \frac{1 + \frac{\vec{v}_{ic} * \vec{m}_{ic}}{\|\vec{v}_{ic}\|}}{\|\vec{v}_{ic}\| \|\vec{v}_{iB}\|}$$

In this equation, the closest contour point from motion model i to the event location is designated as $C_i$. The center point of the motion model i is denoted as $B_i$, the vector from $C_i$ to the event location is denoted as $\vec{V}_{ic}$ and the vector from $B_i$ to the event location is denoted as $\vec{V}_{iB}$. The motion gradient direction at $C_i$ is estimated by averaging over a 5×5 neighborhood around $C_i$, which is denoted as the normal vector $\vec{m}_{ic}$. $\| \|$ indicates the L2 norm.

A score A(i) may be computed for each agent pattern determined to be within a defined distance of the event location during the event time window. A confidence score that the event is to be associated with an agent pattern may be determined for the agent pattern with the highest score A(i), as in 516. In one implementation, the confidence score may be determined based on a ratio between the highest score ($A_{h1}$) and a second highest score ($A_{h2}$)

$$S_{confidence} = 1 - \frac{A_{h2}}{A_{h1}}$$

Finally, a determination is made as to whether the confidence score $S_{confidence}$ exceeds a confidence threshold, as in 518. The confidence threshold may be any value or score and may be different for different agent patterns, different locations within the materials handling facility, different events, etc. If it is determined that the confidence score exceeds the confidence threshold, the event is associated with the agent pattern having the highest score, as in 520. If it is determined that the confidence score does not exceed the threshold, additional processing may be performed to associate an agent with the event, as in 522. Additional processing may include multi-view event association (FIG. 8) and/or manual analysis where the agent patterns, images, and/or other information are sent to one or more humans for manual review.

Figure 8A:
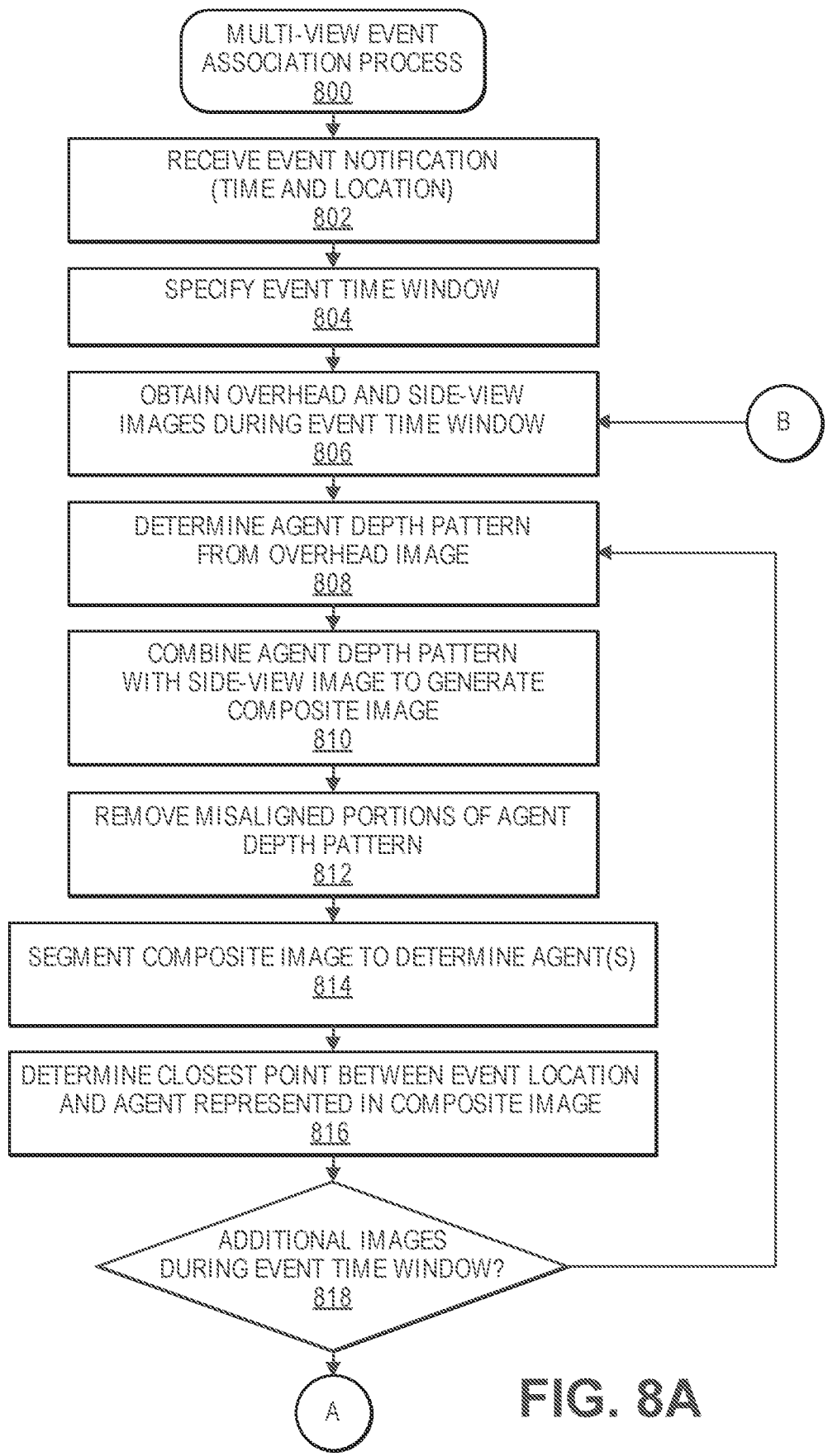
FIGS. 8A-8B are a flow diagram of a multi-view event association process, according to an implementation.
Figure 8B:
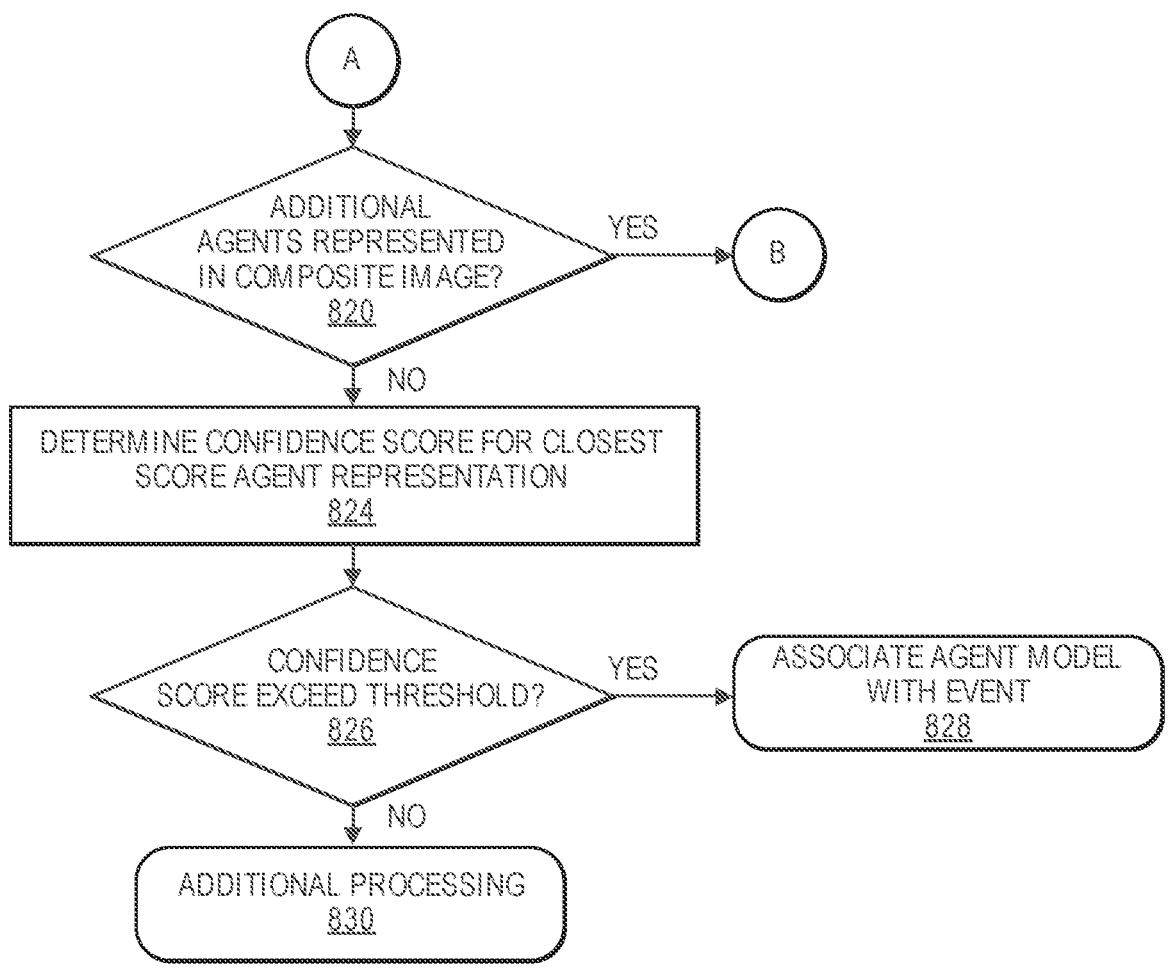

FIGS. 8A-8B are a flow diagram of a multi-view event association process 800, according to an implementation. The example process 800 starts upon receipt of an event notification or event information, as in 802. As discussed above, an event notification or event information indicates at least an event location and an event time or event time duration.

Upon receiving an event notification or event information, an event time window is specified, as in 804. As discussed above, an event time window may be any period of time that includes the event time or event time duration. For example, the event time window may include the event time or event time duration, and one second before and one second following the event time.

Based on the event time window, overhead images that include a representation of the agent pattern(s) within a defined distance of the event location are obtained and side-view images of the event location are obtained, as in 806. For each overhead image and side-view image used with the example process 800, both are created or captured by respective cameras at approximately the same time. Utilizing the overhead images, an agent depth pattern is determined, as in 808. Agents may be tracked as they move about the materials handling facility and may be represented as an agent pattern. Likewise, because the overhead image capture devices are calibrated such that pixels are associated with real space coordinates within the materials handling facility, an agent depth pattern, or point cloud that is representative of the depth of the pixels that correspond to the agent pattern and corresponding coordinate position of the agent can be generated.

Figure 9:
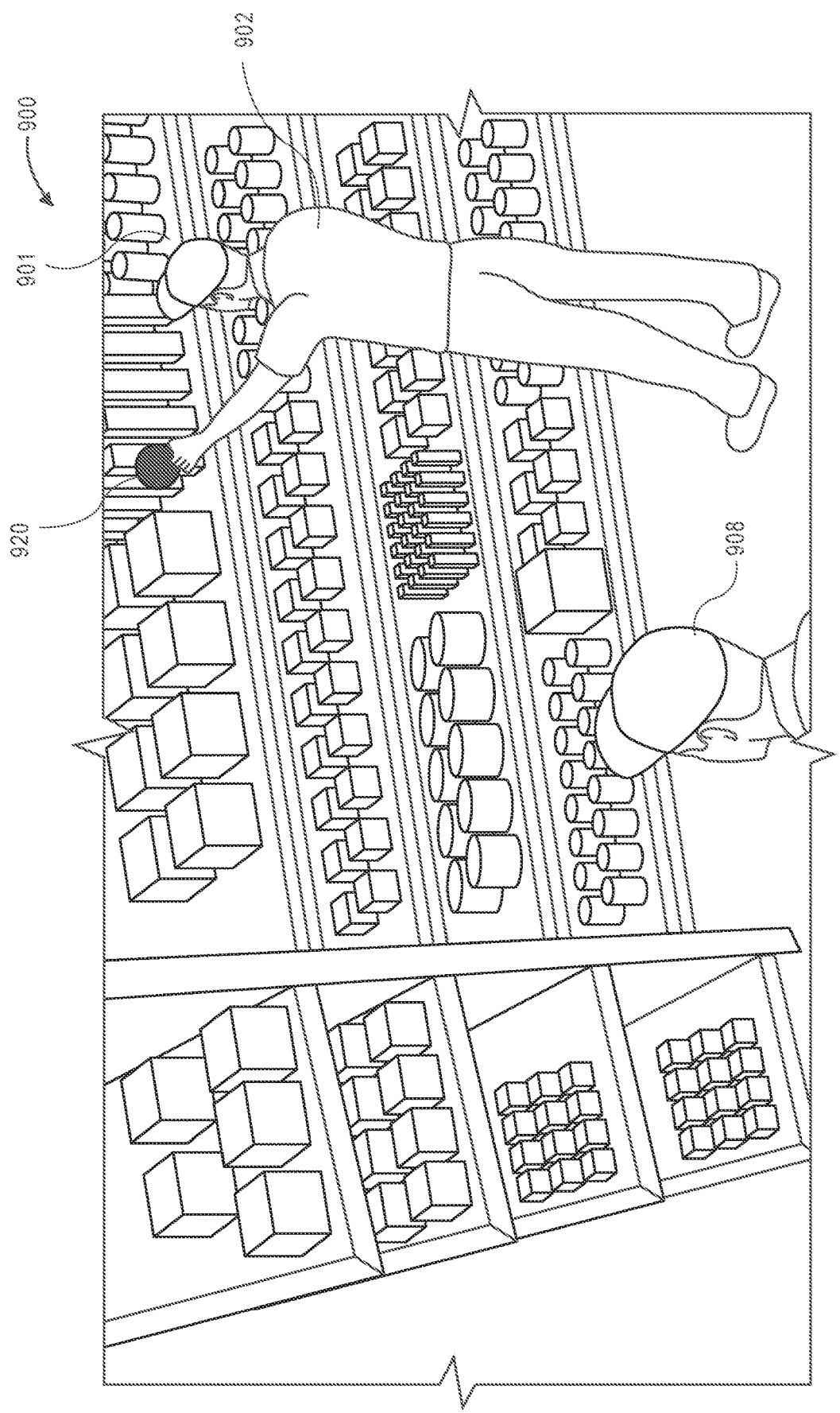
FIG. 9 is a diagram of a side-view image of an inventory location obtained with a side-view camera, according to an implementation.

Likewise, the side-view cameras are calibrated such that pixels correspond to real space coordinates within the materials handling facility. Utilizing the real space coordinates of the side-view image of the event location and the real space coordinates of the agent depth pattern obtained from the overhead images, the generated agent depth pattern is combined with the side-view image to generate a composite image that includes the representation of the event location and the agent and a representation of the agent depth pattern, as in 810. For example, referring to FIG. 9, illustrated is a representation of a side-view image 900 of an inventory location 901 in which an event 920 has occurred, according to an implementation. Also illustrated in the image is a representation of two agents 902, 908. Each pixel of the representation side-view image corresponds to a real space coordinate within the materials handling facility.

It is generally difficult to segment, using computer processing, a group of pixels belonging to the same cluster (e.g., agent pattern) using color information for the pixels. For example, while the agents 902, 908 are identifiable in the side-view image 900, because of the variation in color of the items on the shelves of the inventory location 901, segmentation often results in inaccuracies. Likewise, if multiple agents are standing close to each other such that a portion of the agent patterns overlap from a perspective of the side-view camera, it is difficult to segment the two agents from one another.

Figure 10:
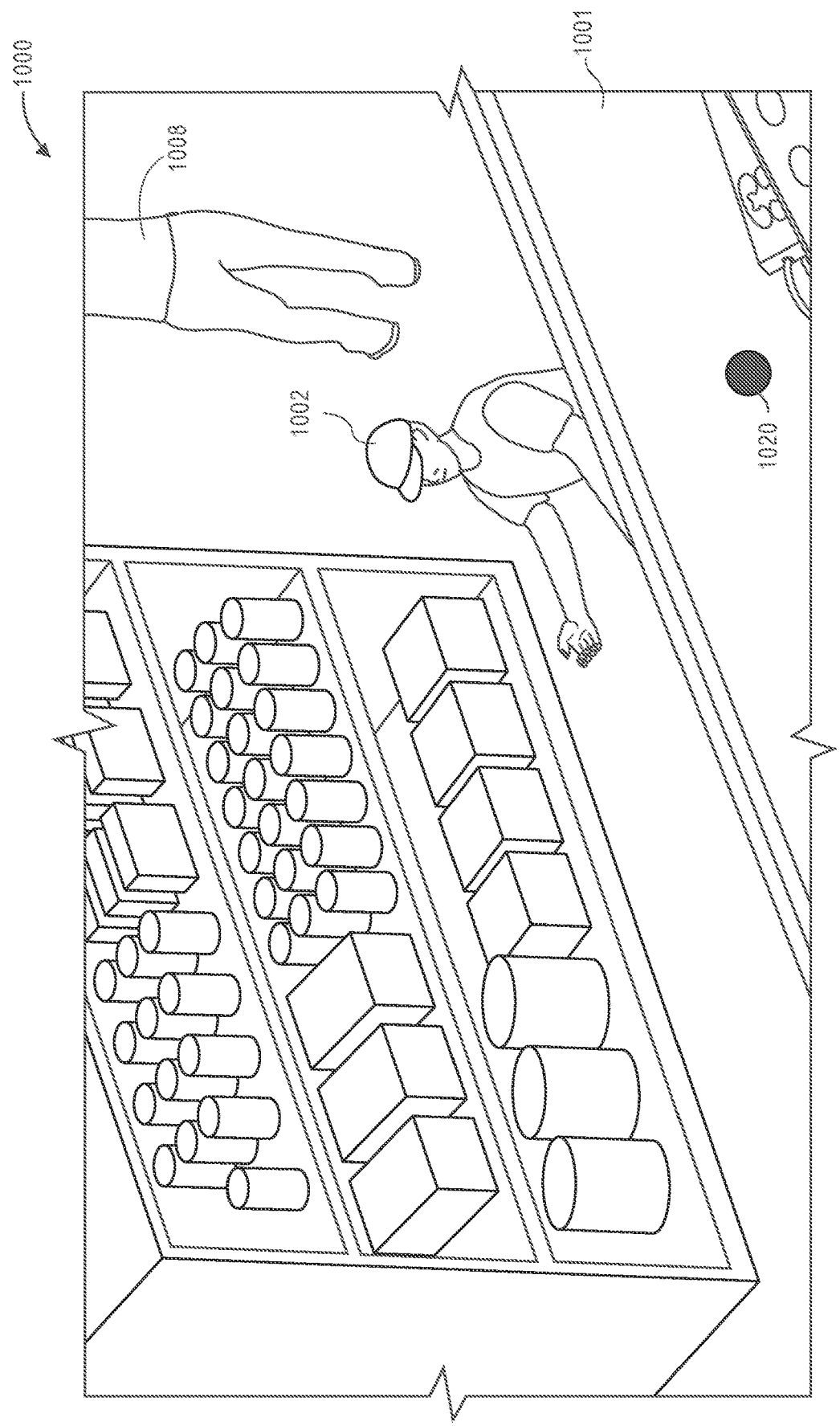
FIG. 10 is a diagram of another side-view image of an inventory location obtained with a side-view camera, according to an implementation.

FIG. 10 illustrates another side-view image 1000 of an inventory location 1001 in which an event 1020 has occurred, according to an implementation. Also illustrated in the image is a representation of the two agents 1002, 1008. In this example, the image 900 (FIG. 9) and the image 1000 (FIG. 10) are different perspective views of the same inventory area and the two agents represented in the images are the same agents. Again, computer segmentation of the agents from other objects and/or other agents in the image may be computationally difficult and often results in inaccuracies due to the variety of sizes and shapes of items on the shelves of the inventory locations and/or overlaps in the representations of the agents.

By combining the agent depth pattern generated from the overhead images with the side-view image and aligning the agent depth pattern based on the coordinates of the pixels, the shape and position of the agent determined from the overhead image can be utilized to determine the portion of the side-view image that includes a representation of the agent. The agent depth pattern is generated based on depth information obtained from the overhead camera and each pixel of the depth pattern corresponds to a real world position within the materials handling facility. For example, as discussed below with respect to FIG. 18, each overhead camera is at a known distance from the surface of the materials handling facility. When an agent or other object is within the field-of view of the overhead camera, distance information indicating a distance between the object and the overhead camera is determined for each pixel. The depth information and the real-world position for each pixel from the overhead camera is used to generate a depth pattern representative of the agent. Likewise, the pixels of the side-view image also correspond to real world positions. To combine the depth pattern with the side-view image, the positions of the depth pattern that correspond to the positions of the side-view image are aligned. For example, for each pixel of the agent depth information having a real world position, a corresponding pixel of the side-view image is determined that has the same or similar real world position. For each pixel of the side-view image having a real world position that is nearest to a pixel of the agent depth information, the corresponding pixel of the agent depth information is presented near that pixel of the side view image such that the pixels are aligned.

Figure 11:
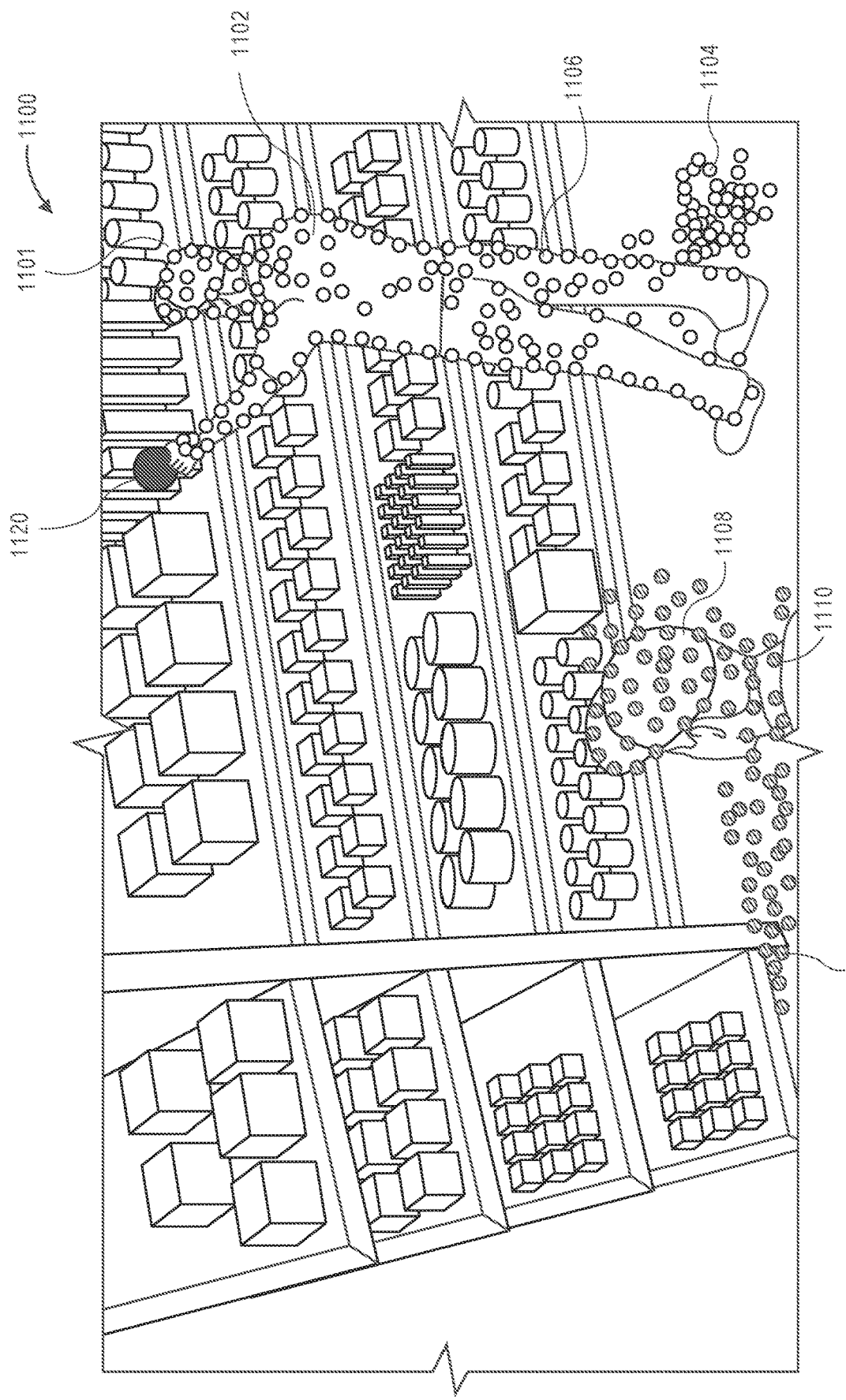
FIG. 11 is a diagram of a side-view image of an inventory location with agent depth patterns, according to an implementation.

For example, referring to FIG. 11, illustrated is a representation of a composite image 1100 that includes the side-view image and a representation of the agent depth patterns 1106, 1110, according to an implementation. FIG. 11 corresponds to the image 900 illustrated in FIG. 9. By aligning the agent depth pattern pixels with the side-view image pixels based on real world positions, the dots that represent the agent depth pattern at different positions correspond with the representations of the agents in the side-view image. For example, the dots of the agent depth pattern 1106 illustrate that the agent depth pattern corresponds with the representation of the agent 1102 and the dots of the agent depth pattern 1110 correspond with the representation of the agent 1108.

As illustrated, some portions of the agent depth pattern may not align with the representation of the agents in the side-view image. For example, the dots 1104, while representative of the agent depth pattern, do not align with the representation of the agent 1102. Likewise, the dots 1112 do not align with the representation of the agent 1108. Such misalignment is a result of the different perspective view of the overhead cameras and the side-view cameras.

Figure 12:
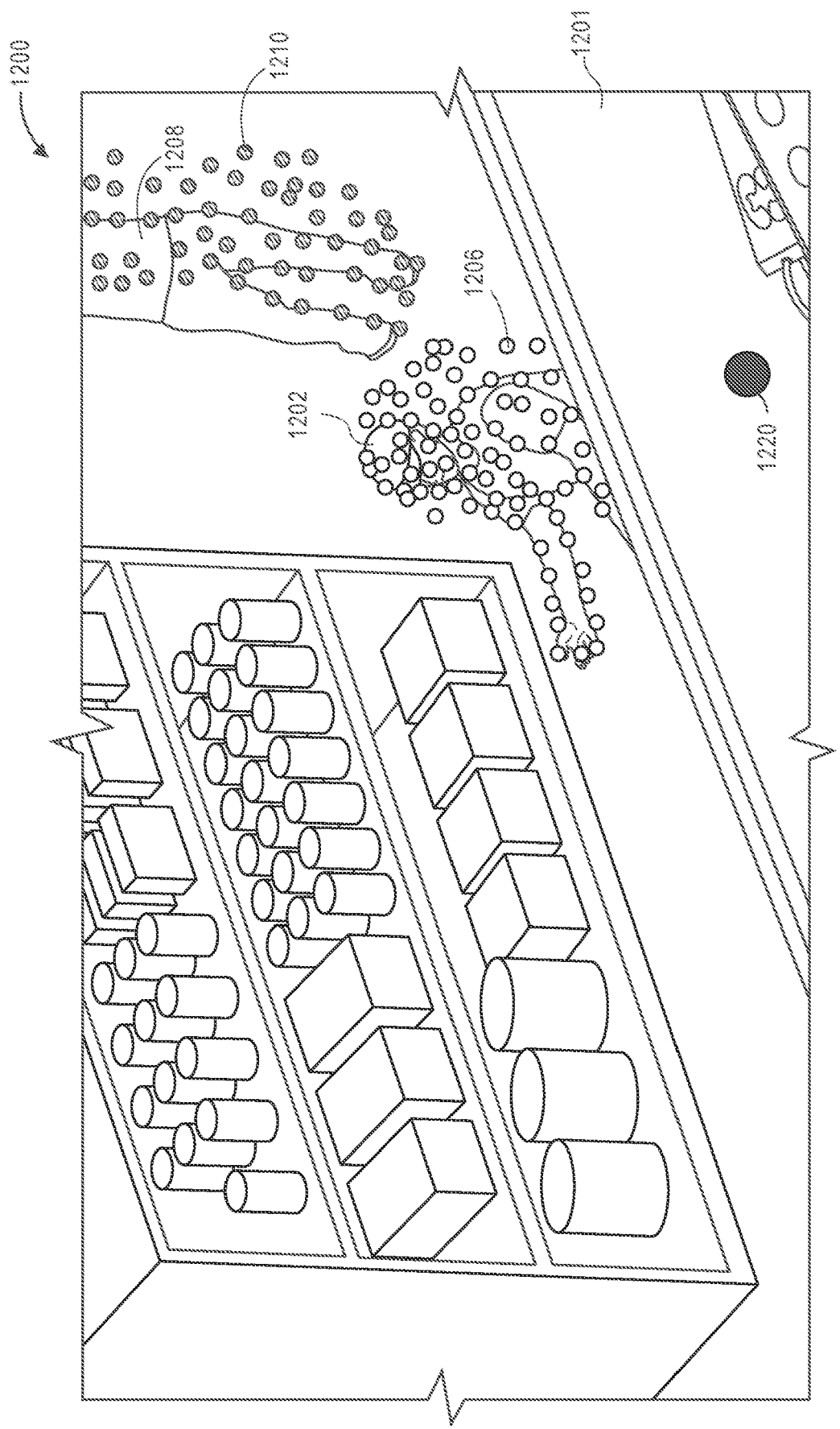
FIG. 12 is another diagram of a side-view image of an inventory location with agent depth patterns, according to an implementation.

FIG. 12 is a representation of another composite image 1200 that includes the side-view image and a representation of agent depth patterns 1206, 1210, according to an implementation. FIG. 12 corresponds to the image 1000 illustrated in FIG. 10. As illustrated, the dots that represent the agent depth patterns at different positions correspond with the representation of the agents in the side-view image. For example, the dots of the agent depth pattern 1206 illustrate that the agent depth pattern corresponds with the representation of the agent 1202 and the dots of the agent depth pattern 1210 correspond with the representation of the agent 1208. Similar to the discussion above with respect to FIG. 11, some portions of the agent depth patterns 1206, 1210 may not align with the representations of the agents in the side-view image 1200 because the different cameras (overhead camera and side-view camera) obtain images from different perspectives.

Returning to FIG. 8A, to resolve misalignment of portions of the agent depth patterns, the position of the agent depth pattern may be adjusted and/or the misaligned portions of the agent depth pattern may be removed, as in 812. For example, background subtraction may be performed on the composite image to remove pixels that have not changed from a background representation of the side-view image. Data subtraction is discussed below with respect to FIG. 14. Portions of the agent depth patterns that correspond with pixels for which data has been removed may be identified as misaligned and removed.

In implementations where multiple side-views of the event location are considered and combined with agent depth information to form composite images, such as those illustrated in FIGS. 11 and 12, the example process 800 may determine which composite image provides the best perspective of the agents and the event location and/or may consider all composite images of the event location. In the current example, the composite image 1100 (FIG. 11) provides a view into the inventory shelf 1101 where the event occurred, as illustrated by the event location 1120. In comparison, the composite image 1200 (FIG. 12) provides a view of the agents 1202, 1208 but cannot view the event location 1220 because the inventory shelf 1201 blocks the view from the perspective of the camera. In some implementations, the example process 800 may select a preferred composite view image. In other implementations, the example process 800 may consider all composite images of the event location and determine an association between an agent and an event. Consideration of multiple composite images is discussed further below.

Figure 13:
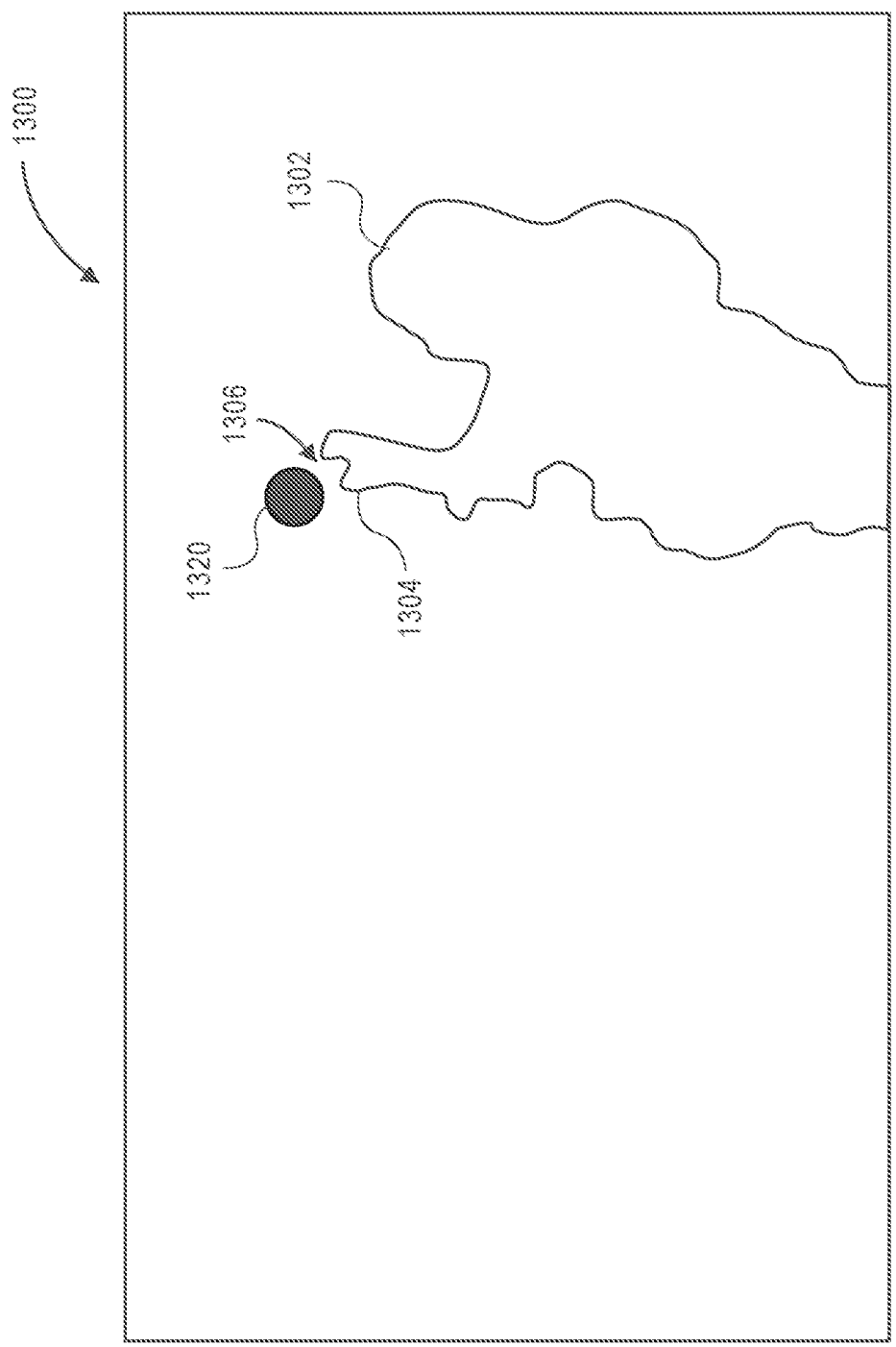
FIG. 13 is a diagram of a side-view agent representation segmented from a side-view image, according to an implementation.

After removing the misaligned portions of the agent depth patterns or adjusting a position of the agent depth patterns, the composite image is segmented to separate and extract different agents represented in the composite image from one another and from other objects represented in the image (e.g., inventory items, inventory locations), as in 814. For example, referring to FIG. 13, illustrated is a segmented image 1300 of an agent segmented from a composite image based on the position of the agent depth pattern obtained from the overhead image of the event location, according to an implementation. The segmentation illustrated in FIG. 13 corresponds to the agent 1202 illustrated in FIG. 12. In this example, the segmented agent pattern 1302 is extracted from the composite image based on the agent depth pattern obtained from the overhead image. In this illustration, all information except for the segmented agent pattern 1302 and the event location 1320 have been removed.

Returning to FIG. 8A, utilizing the segmented agent pattern and the event location, the segmented image is processed to determine a distance between a closest contour point of the segmented agent pattern and the event location, as in 816. For example, referring again to FIG. 13, utilizing the segmented agent pattern 1302 and the event location 1320, the segmented image 1300 is processed to determine a distance 1306 between a closest contour point 1304, represented by a pixel of the segmented agent pattern 1302 and the event location 1320. Because each pixel corresponds to real world positions, the distance may be determined based on a difference in the positions associated with the pixels.

Upon determining a distance between the closest contour point of the segmented agent pattern and the event location, a determination is made as to whether additional images were obtained during the event time window that are to be processed, as in 818 (FIG. 8). For example, if images are obtained at six frames per second for a side-view image capture device and the event time window is one second, the example process 800 may be performed on each of the six frames before the event time and each of the six frames after the event time. Likewise, if there are multiple image capture devices that obtain images of the inventory area where the event was detected, the example process 800 may be performed on images from each of those image capture devices.

If it is determined that additional images are to be processed, the example process returns to block 808 and continues. However, if it is determined that there are no additional images to process, a determination is made as to whether additional agents are represented in one or more of the composite images, as in 820 (FIG. 8B). If it is determined that additional agents are represented in the composite image(s), the example process returns to block 806 (FIG. 8A) and continues. However, if it is determined that there are no additional agents represented in the composite image(s), a confidence score for the agent pattern that is determined to be the closest to the event location is determined, as in 824. In one implementation, the confidence may be determined based on a ratio between the shortest distance ($d_1$) and a second shortest distance ($d_2$) between the agent patterns and the event location:

$$S_{confidence} = 1 - \frac{d_1}{d_2}$$

The confidence score may be determined for each agent represented in each image that is determined to be closest to the event location in that image. Each confidence score for each agent in each image may be compared or compiled to determine an agent pattern having a highest confidence score during the event time window.

Finally, a determination is made as to whether the confidence score $S_{confidence}$ exceeds a confidence threshold, as in 826. The confidence threshold may be any value or score and may be different for different agent patterns, different locations within the materials handling facility, different events, etc. If it is determined that the confidence score exceeds the confidence threshold, the event is associated with the agent pattern having the highest score, as in 828. If it is determined that the confidence score does not exceed the threshold, additional processing may be performed to associate an agent with the event, as in 830. Additional processing may include manual analysis where the agent patterns, images, and/or other information are sent to one or more humans for manual review.

Figure 14:
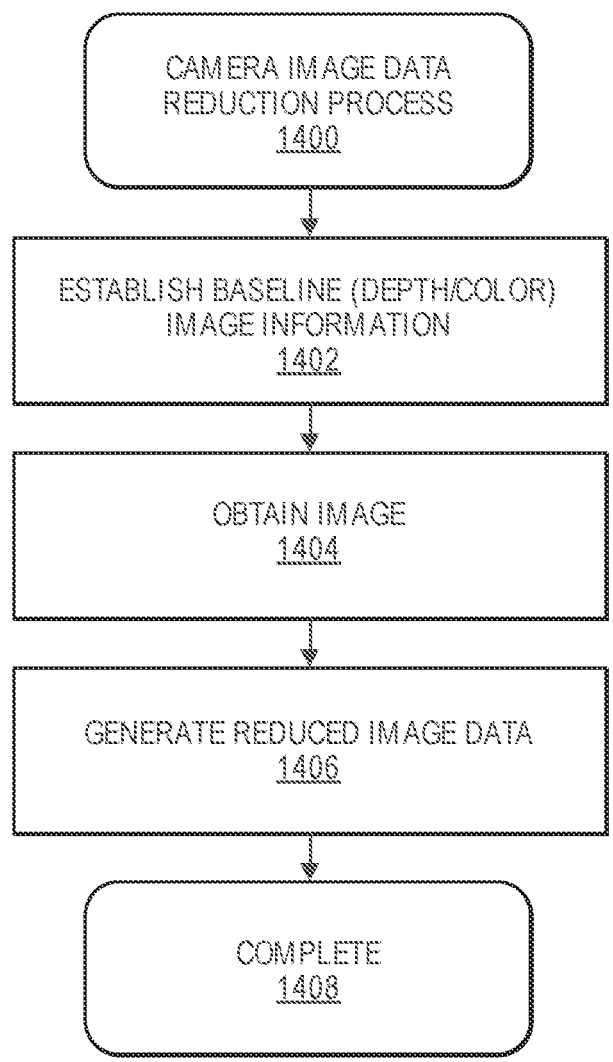
FIG. 14 is a flow diagram of an example image data reduction process, according to an implementation.

FIG. 14 is a flow diagram of an example camera image data reduction process 1400, according to an implementation. The example process 1400 may be performed for each camera, for each camera within a cluster and/or for each cluster. In some implementations, the example process 1400 may be performed using computing components of the camera itself as part of the image capture process. In other implementations, obtained images may be sent from the camera to a camera computing component and the camera computing component may perform the example process 1400. Cameras may be connected to the camera computing component via wired or wireless communication paths. In some implementations, the cameras may be connected with a camera computing component over a wired Ethernet connection or a wired universal serial bus (USB) connection. In addition to providing image data to the camera computing component over such a wired connection, the camera may be powered by the camera computing component and receive power over the wired connection (e.g., power over Ethernet or power over USB).

Multiple cameras of a cluster may provide image data to a camera computing component for processing. Each camera computing component may support, for example, twenty four cameras, receive image data from those cameras and generate reduced image data for each camera, in accordance with the example process 1400. In other implementations, more or fewer cameras may be supported by a camera computing component.

The example process 1400 begins by establishing baseline image information for each location of the materials handling facility, as in 1402. For example, baseline image information may include the depth information for each location within the materials handling facility with respect to a camera, color information, temperature information, etc. In one implementation, each camera may obtain images and determine from those images areas within the field of view that remain unchanged in the image. These areas may be established as baseline image information. This may be done at initiation of the system when there is no activity in the materials handling facility and/or periodically.

For example, when there is no activity in the materials handling facility (e.g., no agents), the example process 1400 may be performed and the baseline image information may include a representation of the field of view of each camera when there is no activity. In other implementations, the example process 1400 may be performed while there is activity in the materials handling facility. For example, a series of image data from a camera may be processed to determine locations that are not changing. This may correspond to baseline image information obtained when the materials handling facility has no activity or it may vary with time. For example, if an agent picks an item from an inventory location and then returns the item to the inventory location but does not place it entirely back onto a shelf of the inventory location, a portion of the item may be included in images obtained by a camera. The change in the depth information for the pixels corresponding to the location of the item will change compared to an existing baseline image. However, because the item is stationary, the depth information for each subsequent image data will be similar. After a defined period of time (e.g., five minutes), the example process may determine that the item should be considered part of the baseline and the depth information for the pixels that represent the item may be updated so that the depth information corresponding to the item is part of the baseline.

In addition to establishing a baseline, images may be periodically obtained by the cameras, as in 1404. The cameras may obtain a series of still images and/or ongoing video from which frames are extracted as image data. For each obtained image, the image data is compared with the baseline image information and pixels with the same or similar information are removed. The remaining pixels, the pixels having information that is different than the baseline image information, are saved to generate reduced image data, as in 1406. In some implementations, pixel information (e.g., color, depth, temperature) may be considered to be the same if the difference between the baseline image information and the current image data are within a tolerance threshold. Due to lighting changes, vibrations, temperature changes, etc., there may be some variation between the baseline image information and the image data. Such variations may fall below a tolerance threshold and not be considered as changes to the pixel information. The tolerance threshold may be any defined value and may be the same or different for different pixels, different cameras, different clusters, etc.

The reduced image data may be used as part of various processes, as discussed herein. Upon generating the reduced image data, the example process 1400 completes, as in 1408.

Figure 15:
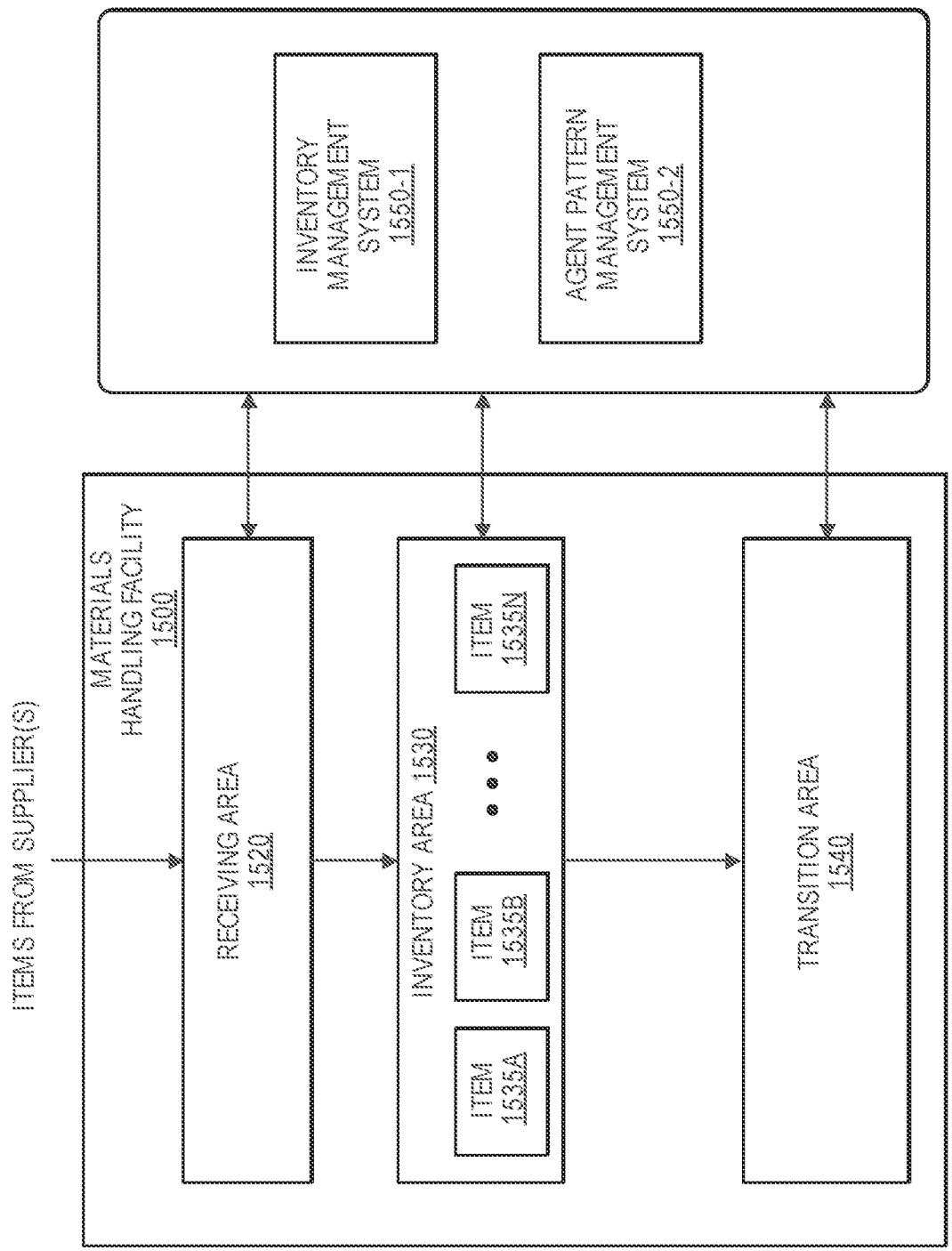
FIG. 15 is a block diagram illustrating a materials handling facility, according to an implementation.

An implementation of a materials handling facility configured to store and manage inventory items is illustrated in FIG. 15. As shown, a materials handling facility 1500 includes a receiving area 1520, an inventory area 1530 configured to store an arbitrary number of inventory items 1535A-1535N, and one or more transition areas 1540. The arrangement of the various areas within materials handling facility 1500 is depicted functionally rather than schematically. For example, in some implementations, multiple different receiving areas 1520, inventory areas 1530 and/or transition areas 1540 may be interspersed rather than segregated. Additionally, the materials handling facility 1500 includes an inventory management system 1550-1 configured to interact with each of receiving area 1520, inventory area 1530, transition area 1540 and/or agents within the materials handling facility 1500. Likewise, the materials handling facility includes an agent pattern management system 1550-2 configured to interact with image capture devices at each of the receiving area 1520, inventory area 1530, and/or transition area 1540 and to track agents as they move throughout the materials handling facility 1500.

The materials handling facility 1500 may be configured to receive different kinds of inventory items 1535 from various suppliers and to store them until an agent retrieves one or more of the items. The general flow of items through the materials handling facility 1500 is indicated using arrows. Specifically, as illustrated in this example, items 1535 may be received from one or more suppliers, such as manufacturers, distributors, wholesalers, etc., at receiving area 1520. In various implementations, items 1535 may include merchandise, commodities, perishables, or any suitable type of item depending on the nature of the enterprise that operates the materials handling facility 1500.

Upon being received from a supplier at receiving area 1520, items 1535 may be prepared for storage. For example, in some implementations, items 1535 may be unpacked or otherwise rearranged and the inventory management system (which, as described, may include one or more software applications executing on a computer system) may be updated to reflect the type, quantity, condition, cost, location or any other suitable parameters with respect to newly received items 1535. It is noted that items 1535 may be stocked, managed or dispensed in terms of countable, individual units or multiples of units, such as packages, cartons, crates, pallets or other suitable aggregations. Alternatively, some items 1535, such as bulk products, commodities, etc., may be stored in continuous or arbitrarily divisible amounts that may not be inherently organized into countable units. Such items 1535 may be managed in terms of measurable quantities, such as units of length, area, volume, weight, or other dimensional properties characterized by units of measurement. Generally speaking, a quantity of an item 1535 may refer to either a countable number of individual or aggregate units of an item 1535 or a measurable amount of an item 1535, as appropriate.

After arriving through receiving area 1520, items 1535 may be stored within inventory area 1530 on an inventory shelf. In some implementations, like items 1535 may be stored or displayed together in bins, on shelves or via other suitable storage mechanisms, such that all items 1535 of a given kind are stored in one location. In other implementations, like items 1535 may be stored in different locations. For example, to optimize retrieval of certain items 1535 having high turnover or velocity within a large physical facility, those items 1535 may be stored in several different locations to reduce congestion that might occur at a single point of storage.

When an order specifying one or more items 1535 is received, or as an agent progresses through the materials handling facility 1500, the corresponding items 1535 may be selected or "picked" (an event) from the inventory area 1530. For example, in one implementation, an agent may have a list of items to pick and may progress through the materials handling facility picking items 1535 from the inventory area 1530. In other implementations, an agent may pick items 1535 using written or electronic pick lists derived from orders. In some instances, an item may need to be repositioned from one location within the inventory area 1530 to another location. For example, in some instances, an item may be picked from its inventory location, moved a distance and placed (an event) at another location. An "event," as used herein, is a detected movement of an item. For example, an event may be a detected movement of an item when the item is picked from an inventory location or a detected movement of an item when the item is placed at an inventory location.

As discussed herein, as the agent moves through the materials handling facility, images of the agent may be obtained and processed by the agent pattern management system 1550-2 to determine an agent pattern representative of the agent and to track a position of the agent as the agent moves. Likewise, in some implementations, descriptors representative of the agent may be periodically determined for the agent from the obtained images as the agent moves about the materials handling facility.

Figure 16:
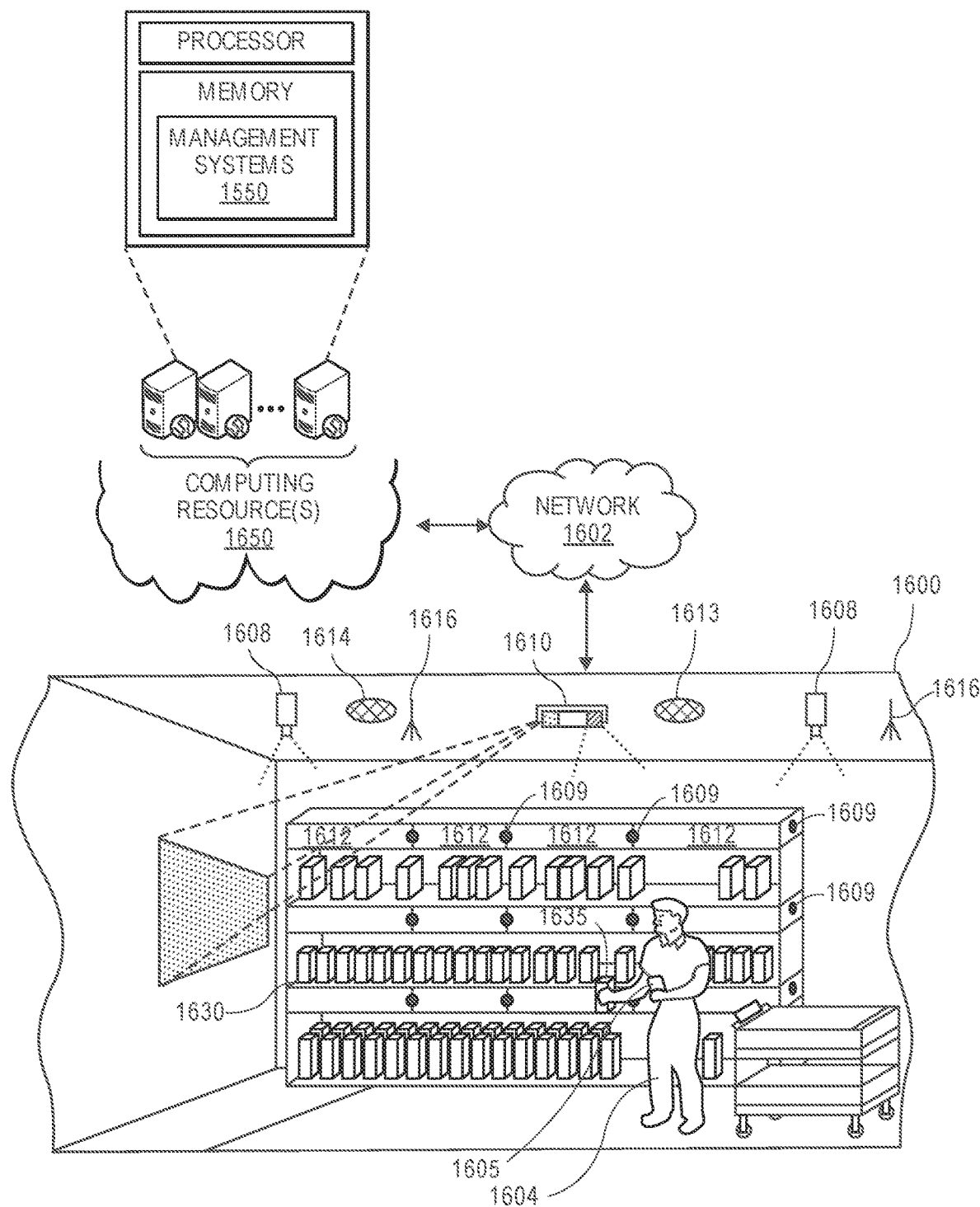
FIG. 16 shows additional components of the materials handling facility of FIG. 15, according to an implementation.

FIG. 16 shows additional components of a materials handling facility 1600, according to one implementation. Generally, the materials handling facility 1600 may include one or more image capture devices 1608, 1609, such as cameras. In some implementations, the overhead image capture devices 1608 may be positioned overhead, such as on the ceiling, and oriented toward a surface (e.g., floor) of the materials handling facility so that the overhead image capture devices 1608 are approximately perpendicular with the surface and the field of view is oriented toward the surface. The overhead image capture devices 1608 are used to capture images of agents and/or locations within the materials handling facility from an overhead or top-down view. Likewise, one or more side-view image capture devices 1609 may be positioned on, inside, or adjacent to inventory areas and/or otherwise positioned and oriented so that an inventory location is within a field of view of the side-view image capture device 1609. For example, a series of side-view image capture devices 1609 may be positioned on external portions of inventory areas and oriented to capture images of agents and/or other inventory locations (e.g., those on an opposite side of an aisle). In some implementations, side-view image capture devices 1609 may be arranged throughout the materials handling facility such that each inventory location is within a field of view of at least two side-view image capture devices 1609.

Any type of image capture device and/or configuration of image capture devices may be used with the implementations described herein. For example, one or more of the image capture devices may be a red, green, blue ("RGB") color camera, still camera, motion capture/video camera, etc. In other implementations, one or more of the image capture devices may be depth sensing cameras, also referred to herein as a RGBD camera. For example, the overhead image capture devices 1608 may each be depth sensing image capture devices and the side-view image capture devices 1609 may be color based (RGB) cameras.

In still other implementations, one or more of the image capture devices may be a thermographic or infrared (IR) camera, etc. In some implementations, the image capture devices may simply be camera modules that include a lens and an image sensor. The image sensor may convert an optical image obtained by the lens of the camera into a digital signal or digital representation of the image (generally referred to herein as image data). In one implementation, the image sensor may be a RGB sensor capable of supporting an image resolution of at least 860×480 at six frames per second. The image sensor may likewise be configured to provide the image data to other components (e.g., a graphics processing unit) for processing and/or other systems, such as the agent pattern management system 1550-2. In some implementations, image capture devices may be paired to provide stereo imagery and depth values indicating a distance between the paired image capture device and an object being imaged. A stereo camera may include a pair of image capture device modules. Image data may be stored in any variety of formats including, but not limited to, YUYV, RGB, RAW, HEX, HSV, HLS, CMYK, bmp, jpeg, etc.

Cameras operate by electronically capturing reflected light from objects and assigning quantitative values to one or more aspects of the reflected light, such as pixels. A camera may include one or more sensors having one or more filters associated therewith. The sensors of a camera may capture information regarding any number of pixels of the reflected light corresponding to one or more base colors (e.g., red, green, or blue) expressed in the reflected light, and store values associated with the pixel colors as image data and/or transmit image data to another device for further analysis or reproduction. The camera may also be configured to determine depth values, such as the distance between the camera and an object in the field of view of the camera. Depth values may be included in or provided with the image data generated by the camera.

Information and/or data regarding features or objects represented in a digital image may be extracted from the image in any number of ways. For example, a color of a pixel or a group of pixels in image data may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, a texture of a feature or object expressed in a digital image may be identified using one or more computer-based methods, such as by identifying changes in intensities within regions or sectors of the image, or by defining areas of an image corresponding to specific surfaces. Furthermore, outlines of objects may be identified in a digital image using one or more algorithms or machine-learning tools. For example, some such algorithms or tools may recognize edges, contours or outlines of objects in the digital image, or of portions of objects, and may match the edges, contours or outlines of the objects against a database containing information regarding edges, contours or outlines of known objects.

In addition to cameras, other input devices, such as pressure sensors, infrared sensors, scales, light curtains, load cells, RFID readers, etc., may be utilized with the implementations described herein. For example, a pressure sensor and/or a scale may be used to detect the presence or absence of items and/or to determine when an item is added and/or removed from inventory areas. Likewise, an RFID reader that can detect a tag included on an item as the item passes into or out of the inventory location may be utilized to detect the presence or absence of an item. For example, if the item includes an RFID tag, an RFID reader may detect the RFID tag as the item passes into or out of the inventory location. Alternatively, or in addition thereto, the inventory shelf may include one or more antenna elements coupled to an RFID reader that are configured to read RFID tags of items located on the inventory shelf.

When an agent 1604 arrives at the materials handling facility 1600, one or more overhead images of the agent 1604 may be captured and processed using overhead cameras 1608 and/or the management systems 1550. For example, the images of the agent 1604 may be processed to identify the agent. This may be done using a variety of techniques, such as object recognition, pattern matching, etc. In some implementations, rather than or in addition to processing images to identify the agent 1604, other techniques may be utilized to identify the agent. For example, the agent may provide an identification (e.g., agent name, password), the agent may present an identifier (e.g., identification badge, card), an RFID tag in the possession of the agent may be detected, a visual tag (e.g., barcode, bokode, watermark) in the possession of the agent may be detected, etc.

The captured images and/or other inputs may also be used to establish an agent pattern for the agent 1604 while located in the materials handling facility 1600. In various implementations, the agent patterns are determined from the overhead image capture devices 1608. As the agent moves, the position and orientation of the agent pattern is updated and is used to track the agent as the agent moves throughout the materials handling facility.

In addition to establishing an agent pattern when the agent first arrives at the materials handling facility and is identified, one or more descriptors representative of the agent or the agent pattern may be determined. For example, one or more descriptor regions may be established, such as a torso region or a head region, and a descriptor representative of the region may be determined, stored in a descriptor data store and associated with the agent or the agent pattern while the agent is located in the materials handling facility. In some implementations, the determined agent patterns of the agent may be stored and maintained as representative of the agent and used at a later point in time to identify the agent (e.g., when the agent returns to the materials handling facility on a different date). In comparison, the descriptors may only be stored for a limited period of time and used to identify the agent during the current time they are in the materials handling facility. When the agent exits the materials handling facility, the descriptors may be discarded.

Returning to FIG. 16, in some implementations, an agent located in the materials handling facility 1600 may possess a portable device 1605 and obtain information about items located within the materials handling facility 1600, receive confirmation that the inventory management system has correctly identified items that are picked and/or placed by the agent, receive requests for confirmation regarding one or more event aspects, etc. Generally, the portable device has at least a wireless module to facilitate communication with the management systems 1550 (e.g., the inventory management system) and a display (e.g., a touch based display) to facilitate visible presentation to and interaction with the agent. The portable device 1605 may store a unique identifier and provide that unique identifier to the management systems 1550 and be used to identify the agent. In some instances, the portable device may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device may operate in conjunction with or may otherwise utilize or communicate with one or more components of the management systems 1550. Likewise, components of the management systems 1550 may interact and communicate with the portable device as well as identify the agent, communicate with the agent via other means and/or communicate with other components of the management systems 1550.

Generally, the management systems 1550 may include one or more input/output devices, such as imaging devices (e.g., cameras) 1608, projectors 1610, displays 1612, speakers 1613, microphones 1614, illumination elements (e.g., lights), etc., to facilitate communication between the management systems 1550 and/or the agent and detection of items, events and/or other actions within the materials handling facility 1600. In some implementations, multiple input/output devices may be distributed within the materials handling facility 1600. For example, there may be multiple imaging devices, such as cameras located on the ceilings (overhead cameras) and/or cameras (such as pico-cameras) located in the aisles near the inventory items (side-view cameras).

Likewise, the management systems 1550 may also include one or more communication devices, such as wireless antennas 1616, which facilitate wireless communication (e.g., Wi-Fi, Near Field Communication (NFC), Bluetooth) between the management systems 1550 and other components or devices. The management systems 1550 may also include one or more computing resource(s) 1650, such as a server system, that may be local to the environment (e.g., materials handling facility), remote from the environment, or any combination thereof.

The management systems 1550 may utilize antennas 1616 within the materials handling facility 1600 to create a network 1602 (e.g., Wi-Fi) so that the components and devices can connect to and communicate with the management systems 1550. For example, when the agent picks an item 1635 from an inventory area 1630, a camera may detect the removal of the item and the management systems 1550 may receive information, such as image data of the performed action (item pick from the inventory area), identifying that an item has been picked from the inventory area 1630. The event aspects (e.g., agent identity, action performed, item involved in the event) may then be determined by the management systems 1550.

Figure 17:
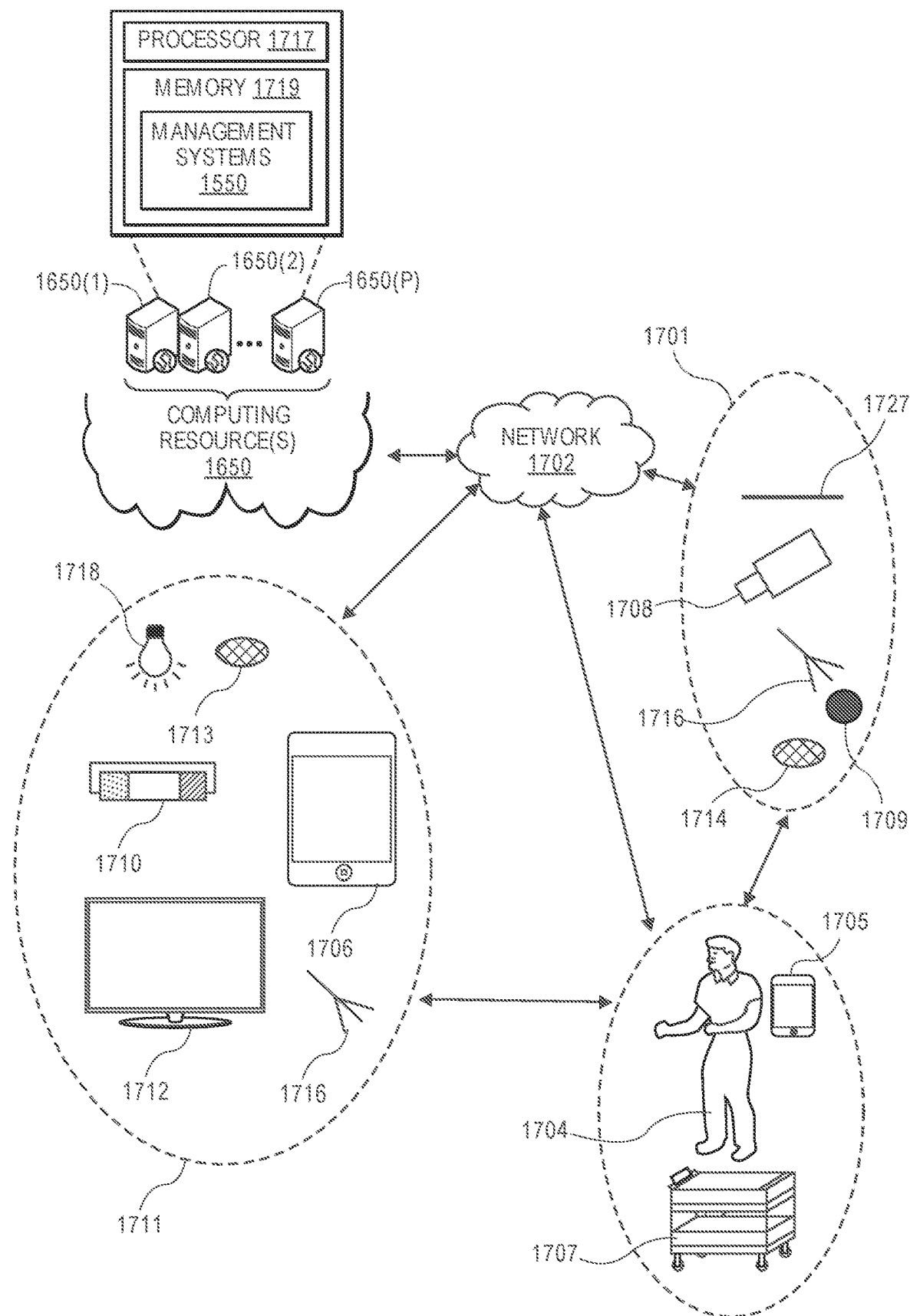
FIG. 17 shows components and communication paths between component types utilized in a materials handling facility of FIG. 15, according to an implementation.

FIG. 17 shows example components and communication paths between component types utilized in a materials handling facility 1500, in accordance with one implementation. A portable device 1705 may communicate and interact with various components of management systems 1550 over a variety of communication paths. Generally, the management systems 1550 may include input components 1701, output components 1711 and computing resource(s) 1650. The input components 1701 may include an overhead imaging device 1708, side-view imaging device 1709, a multiple-camera apparatus 1727, microphone 1714, antenna 1716, or any other component that is capable of receiving input about the surrounding environment and/or from the agent. The output components 1711 may include a projector 1710, a portable device 1706, a display 1712, an antenna 1716, a radio (not shown), speakers 1713, illumination elements 1718 (e.g., lights), and/or any other component that is capable of providing output to the surrounding environment and/or the agent.

The management systems 1550 may also include computing resource(s) 1650. The computing resource(s) 1650 may be local to the environment (e.g., materials handling facility), remote from the environment, or any combination thereof. Likewise, the computing resource(s) 1650 may be configured to communicate over a network 1702 with input components 1701, output components 1711 and/or directly with the portable device 1705, an agent 1704 and/or the tote 1707.

As illustrated, the computing resource(s) 1650 may be remote from the environment and implemented as one or more servers 1650(1), 1650(2), . . . , 1650(P) and may, in some instances, form a portion of a network-accessible computing platform implemented as a computing infrastructure of processors, storage, software, data access, and so forth that is maintained and accessible by components/devices of the management systems 1550 and/or the portable device 1705 via a network 1702, such as an intranet (e.g., local area network), the Internet, etc. The server system 1650 may process images of agents to identify the agent, process images of items to identify items, determine a location of items and/or determine a position of items. The server system(s) 1650 does not require end-agent knowledge of the physical location and configuration of the system that delivers the services. Common expressions associated for these remote computing resource(s) 1650 include "on-demand computing," "software as a service (SaaS)," "platform computing," "network-accessible platform," "cloud services," "data centers," and so forth.

Each of the servers 1650(1)-(P) include a processor 1717 and memory 1719, which may store or otherwise have access to management systems 1550, which may include or provide image processing (e.g., for agent identification, item identification, etc.), inventory tracking, and/or location determination.

The network 1702 may utilize wired technologies (e.g., wires, USB, fiber optic cable, etc.), wireless technologies (e.g., radio frequency, infrared, NFC, cellular, satellite, Bluetooth, etc.), or other connection technologies. The network 1702 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

The various sensors and computer systems described above may collect a wide variety of data relating to users of systems or facilities employing such sensors or computer systems. The data relating to users may include, for example, images, video, location information, travel patterns, personal identification information, transaction history information, user preferences, and the like. The sensors, systems, and techniques described herein would be typically configured to process this information in a manner that ensures compliance with all appropriate laws, regulations, standards, and the like.

FIG. 18 is a block diagram of an overhead view of a cluster 1860, according to an implementation. A cluster may represent a segment of a materials handling facility 1500. In some implementations, a single materials handling facility may include a plurality of clusters. In other implementations, a single cluster may be used to cover an entire materials handling facility.

Within each cluster 1860, a plurality of cameras 1808 may be positioned overhead (e.g., on a ceiling), referred to herein as overhead cameras or overhead image captures devices, at defined locations so that the collective field of view of the cameras covers the entire surface of the portion of the materials handling facility corresponding to the cluster 1860. In some implementations, a grid 1802 system, physical or virtual, is oriented with the shape of the materials handling facility (e.g., oriented with the walls of the materials handling facility). The grid 1802 may be utilized to attach or mount cameras within the cluster 1860 at defined locations with respect to the physical space of the materials handling facility. For example, in some implementations, the cameras may be positioned at any one foot increment from other cameras along the grid.

By mounting the cameras overhead at defined locations along the grid, the cameras can be associated with physical coordinates, also referred to herein as real world positions, within the materials handling facility. For example, if the cluster 1860 represents the north-west corner of a materials handling facility, the grid 1802 may be segmented into columns and rows and cameras may be positioned at any point on the grid. The columns and rows may be identified using any nomenclature, such as alphabetical characters for columns and numeric characters for rows. Each column:row intersection is at a defined physical location within the materials handling facility. For example, if the grid is positioned in one foot by one foot increments, the physical location within the materials handling facility of every grid intersection and any connected cameras is known. In this example, camera 1808A is positioned at grid coordinate B:3, which corresponds to the horizontal coordinate of the camera being positioned approximately two feet by three feet from the origin (in this example the upper left corner) of the cluster.

Because the field of view 1804 of the cameras 1808 may not be circular, the cameras may be placed at defined directions (e.g., 0, 90, 180, 270 degrees). The direction of the camera may be determined based on the field of view 1804 coverage of adjacent cameras and/or the layout of objects on the surface of the materials handling facility. For example, if the camera 1808 is being mounted above an aisle between two inventory locations, the direction of the camera may be set so that the larger portion of the field of view 1804 of the camera covers the length of the aisle.

The height of the cameras from the surface, the distance between camera placement and/or direction of the cameras 1808 within the cluster 1860 may vary depending on the layout of the materials handling facility, the lighting conditions in the cluster, the volume of agents expected to pass through a portion of the cluster, the activities and/or volume of activities expected to occur at different locations within the cluster, etc. For example, cameras may typically be mounted horizontally every three to four feet in one direction and every four to five feet in another direction along the grid 1802 so that the field of view of each camera overlaps, as illustrated in FIG. 18.

In some implementations, the height of the cameras from the surface and the distance between cameras may be set so that their fields of view intersect and begin to overlap approximately seven feet above the surface of the materials handling facility. Positioning the cameras so that the fields of view overlap at approximately seven feet will result in the majority of agents being within a field of view of a camera at all times. If the field of view of the cameras did not overlap until they were approximately three feet above the surface, as an agent moves between the fields of view, the portion of the agent that is taller than approximately three feet would exit one field of view and not enter the next field of view until the agent has moved into that range of the camera. As such, a portion of the agent is not detectable as they transition between fields of view. Likewise, by overlapping the fields of view of multiple cameras, each of the overlapping cameras may capture images that include representations of the agent from slightly different perspectives. This image data may be combined and utilized to develop a three dimensional, or partially three dimensional model, or agent pattern, of the agent.

While this example describes overlapping camera fields of view at approximately seven feet above the surface of the materials handling facility, in other implementations, the cameras may be positioned so that the fields of view begin to overlap at different heights (e.g., six feet, eight feet).

In some areas of the cluster, such as cluster area 1806, cameras 1808 may be positioned closer together and/or closer to the surface area, thereby reducing their field of view, increasing the amount of field of view overlap, and/or increasing the amount of coverage for the area. Increasing camera density may be desirable in areas where there is a high volume of activity (e.g., item picks, item places, agent dwell time), high traffic areas, high value items, poor lighting conditions, etc. By increasing the amount of coverage, the image data increases, thereby increasing the likelihood that an activity or action will be properly determined.

In some implementations, one or more markers 1810 may be positioned throughout the cluster and used to aid in alignment of the cameras 1808. The markers 1810 may be placed at any location within the cluster. For example, if the markers are placed where there is an overlap in the field of view of two or more cameras, the cameras may be aligned with respect to one another, thereby identifying the pixel overlap between the cameras and aligning the pixels of the cameras. The markers may be any identifiable indicator and may be temporary or permanent.

In some implementations, the markers 1810 may be placed on the surface of the materials handling facility. In other implementations, the markers 1810 may be placed on a visible surface of an inventory location 1830 within the cluster. In still other implementations, the inventory location 1830 itself may be utilized as a marker. Alternatively, or in addition thereto, one or more inventory items that are viewable by the cameras may be used as the marker 1810. In still other examples, the surface of the materials handling facility may have a detectable pattern, marks, defects, etc., that can be determined and used as markers 1810 to align cameras.

In some implementations, the markers 1810 may be temporarily placed at locations within the materials handling facility and used to calibrate the cameras. During calibration, the cameras may be aligned with respect to one another by aligning the position of the markers 1810 in each camera's field of view. Likewise, the field of view of each camera may be determined and associated with coordinates of the materials handling facility.

The cameras 1808 of a cluster may obtain images (still images or video) and process those images to reduce the image data and/or provide the image data to other components. As discussed above, image data for each image or frame may be reduced to only include pixel information for pixels that have been determined to have changed. For example, baseline image information may be maintained for a field of view of a camera corresponding to the static or expected view of the materials handling facility. Image data for an image may be compared to the baseline image information and the image data may be reduced by removing or subtracting out pixel information that is the same in the image data as the baseline image information. Image data reduction may be done by each camera. Alternatively, groups of cameras may be connected with a camera processor that processes image data from a group of cameras to reduce the image data of those cameras. Image data reduction is discussed above with respect to FIG. 14.

Real world positions for pixels of the side-view cameras may be determined in a similar manner to that discussed above with respect to the overhead cameras. For example, by mounting side-view cameras and orienting the field of view of those cameras toward inventory locations, the pixels of those cameras can be associated with real world positions of the inventory locations.

In some implementations, one or more markers may be positioned throughout the inventory locations to aid in alignment of the side-view cameras. The markers may be placed at any location that is within the field of view of one or more of the side view cameras. For example, if the markers are placed where there is an overlap in the field of view of two or more cameras, the cameras may be aligned with respect to one another, thereby identifying the pixel overlap between the cameras and aligning the pixels of the cameras. The markers may be any identifiable indicator and may be temporary or permanent.

In some implementations, the markers may be placed on a front surface of the inventory locations. In other implementations, an inventory location itself may be utilized as a marker. Alternatively, or in addition thereto, one or more inventory items that are viewable by the side-view cameras may be used as a marker.

Figure 19:
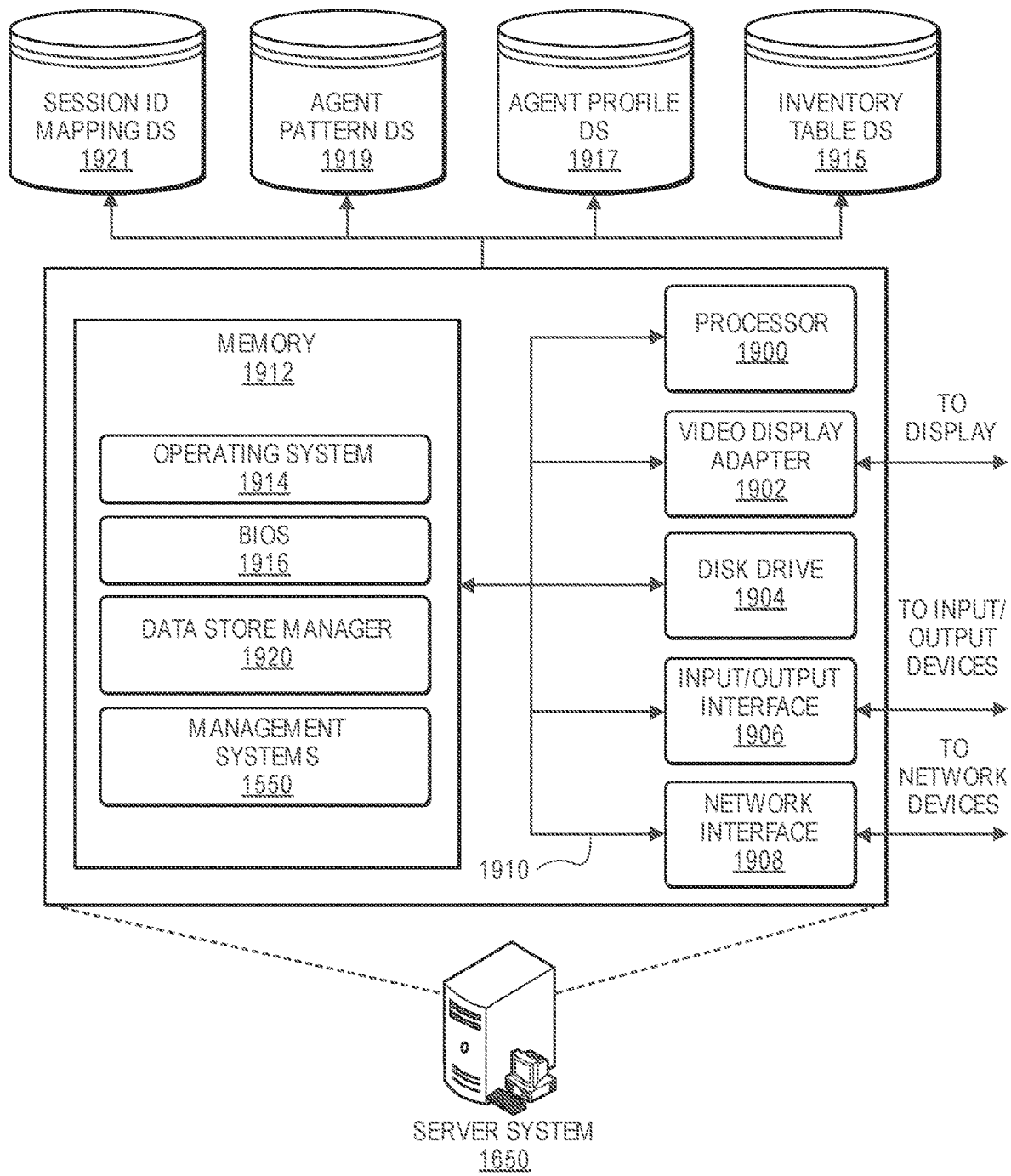
FIG. 19 is a block diagram of an illustrative implementation of a server system that may be used with various implementations.

FIG. 19 is a pictorial diagram of an illustrative implementation of a server system, such as the server system 1650, that may be used in the implementations described herein. The server system illustrated in FIG. 19, or another similar server system, may be configured as the management system (e.g., inventory management system, agent pattern management system).

The server system 1650 may include a processor 1900, such as one or more redundant processors, a video display adapter 1902, a disk drive 1904, an input/output interface 1906, a network interface 1908, and a memory 1912. The processor 1900, the video display adapter 1902, the disk drive 1904, the input/output interface 1906, the network interface 1908, and the memory 1912 may be communicatively coupled to each other by a communication bus 1910.

The video display adapter 1902 provides display signals to a local display (not shown in FIG. 19) permitting an operator of the server system 1650 to monitor and configure operation of the server system 1650. The input/output interface 1906 likewise communicates with external input/output devices not shown in FIG. 19, such as a mouse, keyboard, scanner, or other input and output devices that can be operated by an operator of the server system 1650. The network interface 1908 includes hardware, software, or any combination thereof, to communicate with other computing devices. For example, the network interface 1908 may be configured to provide communications between the server system 1650 and other computing devices via the network 1702, as shown in FIG. 17.

The memory 1912 generally comprises random access memory (RAM), read-only memory (ROM), flash memory, and/or other volatile or permanent memory. The memory 1912 is shown storing an operating system 1914 for controlling the operation of the server system 1650. A binary input/output system (BIOS) 1916 for controlling the low-level operation of the server system 1650 is also stored in the memory 1912.

The memory 1912 additionally stores program code and data for providing network services. The data store manager application 1920 facilitates data exchange between the inventory table data store 1915, the agent profile data store 1917, the agent pattern data store 1919 and/or the session identifier mapping data store 1921.

As used herein, the term "data store" refers to any device or combination of devices capable of storing, accessing and retrieving data which may include any combination and number of data servers, databases, data storage devices and data storage media in any standard, distributed or clustered environment. The server system 1650 can include any appropriate hardware and software for integrating with the data stores 1915, 1917, 1919, 1921 as needed to execute aspects of the management systems 1550.

The data stores 1915, 1917, 1919, 1921 can include several separate data tables, databases or other data storage mechanisms and media for storing data relating to a particular aspect. For example, the data stores 1915, 1917, 1919, 1921 illustrated include mechanisms for maintaining inventory information (e.g., item locations, images of item when properly positioned, depth map information for an item located on an inventory shelf, item features), agent profile information, agent pattern information, correlations between cameras and real world positions, etc.

It should be understood that there can be many other aspects that may be stored in the data stores 1915, 1917, 1919, 1921. The data stores 1915, 1917, 1919, 1921 are operable, through logic associated therewith, to receive instructions from the server system 1650 and obtain, update or otherwise process data in response thereto.

The memory 1912 may also include the inventory management system and/or agent pattern management system, as discussed above, and as generally illustrated by the management systems 1550. The corresponding management systems 1550 may be executable by the processor 1900 to implement one or more of the functions of the server system 1650. In one implementation, the corresponding management systems 1550 may represent instructions embodied in one or more software programs stored in the memory 1912. In another implementation, the corresponding management systems 1550 can represent hardware, software instructions, or a combination thereof.

It will be appreciated by those of ordinary skill in the art that such a system could operate equally well in a system having fewer or a greater number of components than are illustrated in FIG. 19. Thus, the depiction in FIG. 19 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer implemented method, comprising:
   detecting an occurrence of an event at a location;
   processing a first data produced during an event time window corresponding to the event to determine a probability score indicative of a probability that an agent participated in the event;
   determining, based at least in part on the probability score, that additional processing is needed to determine that the agent participated in the event;
   in response to determining that additional processing is needed, performing at least one of a motion model analysis or a multi-view analysis to determine that the agent participated in the event, wherein:
      the motion model analysis includes:
         determining a motion of the agent during the event time window; and
         determining, based at least in part on the motion, a first confidence score indicative of a first confidence that the agent participated in the event; and
      the multi-view analysis includes:
         generating a composite image of the agent based on a second data obtained from an overhead imaging device and a third data obtained from a side-view imaging device, wherein:
            the overhead imaging device is positioned above the agent and oriented downward toward the agent such that at least a first portion of the agent is represented in the second data;
            the side-view imaging device is positioned and oriented such that at least a portion of the location is within a field of view of the side-view imaging device and represented in the third data; and
            the overhead imaging device and the side-view imaging device obtain second data and the third data from different perspectives;
         determining, based at least in part on the composite image, a second confidence score indicative of a second confidence that the agent participated in the event; and
   determining, based at least in part on one or more of the first confidence score or the second confidence score, that the agent participated in the event.

2. The computer implemented method of claim 1, wherein processing the first data further includes:
   processing the first data to determine at least one of a touch point between the agent and the location during the event time window, an arm trajectory of the agent during the event time window, or an orientation of the agent during the event time window; and
   determining the probability score based at least in part on one or more of the touch point, the arm trajectory, or the orientation.

3. The computer implemented method of claim 1, wherein the overhead imaging device has a second field of view and is oriented such that at least a second portion of the location is within the second field of view and represented in the second data.

4. The computer implemented method of claim 1, wherein determining the motion of the agent during the event time window further includes:
   combining a plurality of pixels of at least some of a plurality of overhead images to form a motion model; and
   altering at least some of the plurality of pixels representative of the agent to represent a gradient history illustrating the motion of the agent during the event time window.

5. The computer implemented method of claim 4, wherein determining the first confidence score further includes:
   searching pixels of the plurality of pixels of the motion model to determine a closest contour point of the motion model to the location;
   determining a distance between the closest contour point of the motion model and the location; and
   determining the first confidence score based at least in part on the distance and the motion model.

6. The computer implemented method of claim 1, wherein generating the composite image further includes:
   obtaining a depth information created by the overhead imaging device at a first time during the event time window;
   obtaining a side-view image created by the side-view imaging device at approximately the first time;
   generating a first depth pattern based at least in part on depth information; and
   combining the first depth pattern and the side-view image to form the composite image.

7. The computer implemented method of claim 6, wherein determining the second confidence score further includes:
   processing the composite image to determine a representation of the agent in the composite image;
   determining a distance between the representation of the agent and the location; and
   determining, based at least in part on the distance, the second confidence score.

8. A computing system, comprising:
   one or more processors; and
   a memory coupled to the one or more processors and storing program instructions that when executed by the one or more processors cause the one or more processors to at least:
      detect an occurrence of an event at a location;
      perform at least one of a motion model analysis or a multi-view analysis to determine an agent that participated in the event, wherein:
         performance of the motion model analysis includes:
            determine a motion of the agent during an event time window corresponding to the event; and determine, based at least in part on the motion, a first confidence score indicative of a first confidence that the agent participated in the event; and performance of the multi-view analysis includes:
generate a composite image of the agent based on a first data obtained from an overhead imaging device and a second data obtained from a side-view imaging device, wherein:
the overhead imaging device is positioned above the agent and is oriented such that at least a first portion of the agent is within a first field of view of the overhead imaging device and represented in the first data; and
the side-view imaging device is positioned and oriented such that at least a first portion of the location is within a second field of view of the side-view imaging device and represented in the second data, wherein the first field of view and the second field of view are different;
determine, based at least in part on the composite image, a second confidence score indicative of a second confidence that the agent participated in the event; and
determine, based at least in part on one or more of the first confidence score or the second confidence score, that the agent participated in the event.

9. The computing system of claim 8, wherein the program instructions, when executed by the one or more processors, further cause the one or more processors to at least:
process a third data produced during the event time window to determine a probability score indicative of a probability that the agent participated in the event;
determine, based at least in part on the probability score, that additional processing is needed to determine that the agent participated in the event; and
in response to a determination that additional processing is needed, perform the at least one of the motion model analysis or the multi-view analysis.

10. The computing system of claim 9, wherein the program instructions that when executed by the one or more processors to process the third data, further include instructions that, when executed by the one or more processors, further cause the one or more processors to at least:
process the third data to determine at least one of a touch point between the agent and the location during the event time window, an arm trajectory of the agent during the event time window, or an orientation of the agent during the event time window; and
determine the probability score based at least in part on one or more of the touch point, the arm trajectory, or the orientation.

11. The computing system of claim 8, wherein the overhead imaging device is oriented such that at least a second portion of the location is within the first field of view and represented in the first data.

12. The computing system of claim 8, wherein the program instructions, when executed by the one or more processors to perform the motion model analysis, further include instructions that when executed by the one or more processors further cause the one or more processors to at least:
combine a plurality of pixels of at least some of a plurality of overhead images to form a motion model;
determine a center point of the motion model;
search pixels of the plurality of pixels of the motion model corresponding to an area between the center point and the location to determine a closest contour point of the motion model that is a minimum distance from the location; and
determine the first confidence score based at least in part on the closest contour point or the minimum distance.

13. The computing system of claim 12, wherein the program instructions, when executed by the one or more processors, further cause the one or more processors to at least:
determine a first real world position corresponding to the location;
determine a second real world position corresponding to a pixel of an overhead image that represents the closest contour point;
determine a distance between the first real world position and the second real world position; and
wherein the minimum distance is the distance.

14. The computing system of claim 8, wherein the program instructions, when executed by the one or more processors to generate the composite image, further include instructions that, when executed by the one or more processors further cause the one or more processors to at least:
obtain a depth information created by the overhead imaging device at a first time during the event time window;
obtain a side-view image created by the side-view imaging device at approximately the first time;
generate a first depth pattern based at least in part on depth information; and
combine the first depth pattern and the side-view image to form the composite image.

15. A system, comprising:
an overhead device oriented toward a location;
a side-view device oriented toward the location;
one or more processors; and
a memory coupled to the one or more processors and storing program instructions that when executed by the one or more processors cause the one or more processors to at least:
process a first data produced during an event time window corresponding to an event to determine a probability score indicative of a probability that an agent participated in the event;
determine, based at least in part on the probability score, that additional processing is needed to determine that the agent participated in the event;
in response to a determination that additional processing is needed, perform at least one of a motion model analysis or a multi-view analysis to determine that the agent participated in the event, wherein:
performance of the motion model analysis includes:
determine a motion of the agent during the event time window; and
determine, based at least in part on the motion, a first confidence score indicative of a first confidence that the agent participated in the event; and
performance of the multi-view analysis includes:
generate a composite image of the agent based on a second data obtained from an overhead imaging device and a third data obtained from a side-view imaging device, wherein:
the overhead imaging device is at a first position above the agent and has a first field of view that includes at least a first portion of the agent and the first portion of the agent is represented in the second data; and the side-view imaging device is at a second position that is different than the first position and has a second field of view that includes at least a second portion of the agent and the second portion of the agent is represented in the second data;
- determine, based at least in part on the composite image, a second confidence score indicative of a second confidence that the agent participated in the event; and
- determine, based at least in part on one or more of the first confidence score or the second confidence score, that the agent participated in the event.

16. The system of claim 15, wherein the event is determined based at least in part on a movement of an item at the location.

17. The system of claim 15, wherein the program instructions, that when executed by the one or more processors to detect the event, further include instructions that when executed by the one or more processors further cause the one or more processors to at least:
- receive event information indicating an occurrence of the event, wherein the event information includes an event time or an event time duration; and
- determine, based at least in part on the event information, the event time window that includes the event time or the event time duration.

18. The system of claim 15, wherein the program instructions, when executed by the one or more processors to perform the motion model analysis, further include instructions that when executed by the one or more processors further cause the one or more processors to at least:
- combine a plurality of pixels of at least some of a plurality of overhead images to form a motion model;
- determine a center point of the motion model;
- search pixels of the plurality of pixels of the motion model corresponding to an area between the center point and the location to determine a closest contour point of the motion model that is a minimum distance from the location; and
- determine the first confidence score based at least in part on the closest contour point or the minimum distance.

19. The system of claim 15, wherein the program instructions, when executed by the one or more processors to generate the composite image, further include instructions that, when executed by the one or more processors further cause the one or more processors to at least:
- obtain a depth information created by the overhead imaging device at a first time during the event time window;
- obtain a side-view image created by the side-view imaging device at approximately the first time;
- generate a first depth pattern based at least in part on depth information; and
- combine the first depth pattern and the side-view image to form the composite image.

20. The system of claim 15, wherein the program instructions that when executed by the one or more processors further cause the one or more processors to at least:
- process the first data to determine a second probability score indicative of a second probability that a second agent participated in the event; and
- determine, based at least in part on the probability score and the second probability score that additional processing is needed.

21. The system of claim 15, wherein the second field of view of the side-view imaging device includes at least a portion of the location and the portion of the location is represented in the third data.

22. The system of claim 15, wherein the first field of view of the overhead imaging device includes at least a portion of the location and the portion of the location is represented in the third data.

* * * * *